July 2, 1968  G. A. HUGHES ET AL  3,391,170

13-ALKYLGONA-1,3,5(10),9(11)-TETRAENES

Filed Sept. 21, 1965  2 Sheets-Sheet 1

INVENTORS
GORDON A. HUGHES
HERCHEL SMITH
BY Vito Victor Bellino
ATTORNEY

July 2, 1968 G. A. HUGHES ET AL 3,391,170
13-ALKYLGONA-1,3,5(10),9(11)-TETRAENES
Filed Sept. 21, 1965 2 Sheets-Sheet 2

INVENTORS
GORDON A. HUGHES
HERCHEL SMITH
BY Vito Victor Bellino
ATTORNEY 3,391,170
13-ALKYLGONA-1,3,5(10),9(11)-TETRAENES
Gordon Alan Hughes, Wayne, Pa., and Herchel Smith,
500 Chestnut Lane, Wayne, Pa. 19087; said Hughes
assignor to said Smith
Continuation-in-part of application Ser. No. 228,384,
Oct. 4, 1962. This application Sept. 21, 1965, Ser.
No. 488,936
15 Claims. (Cl. 260—397.45)

ABSTRACT OF THE DISCLOSURE

The preparation of 13-methylgona-1,3,5(10),9(11)-tetraenes and novel 13-polycarbon-alkylgona-1,3,5(10),9(11)-tetraenes by rearrangement of the corresponding gona-1,3,5(10),8-tetraenes is described. These compounds have estrogenic and anti-lipemic activity and, in addition, are useful as intermediates for the preparation of compounds having estrogenic, anti-lipemic, progestational, anabolic, and androgenic activities.

---

This application a continuation-in-part of co-pending appliaction Ser. No. 228,384, filed Oct. 4, 1962; which in turn is a continuation of applications Ser. No. 57,904, filed Sept. 23, 1960; Ser. No. 91,341, filed Feb. 24, 1961; Ser. No. 137,535, filed Sept. 12, 1961; Ser. No. 195,000, filed May 15, 1962; and Ser. No. 196,557, filed May 16, 1962; all abandoned.

This invention relates to compositions of matter classified in the art of chemistry as substituted unsaturated-gonane derivatives, to intermediates therefor, and to processes for making and using such compositions.

In describing the invention, reference will be made in the following specification to the annexed drawings, wherein.

Figure 1:
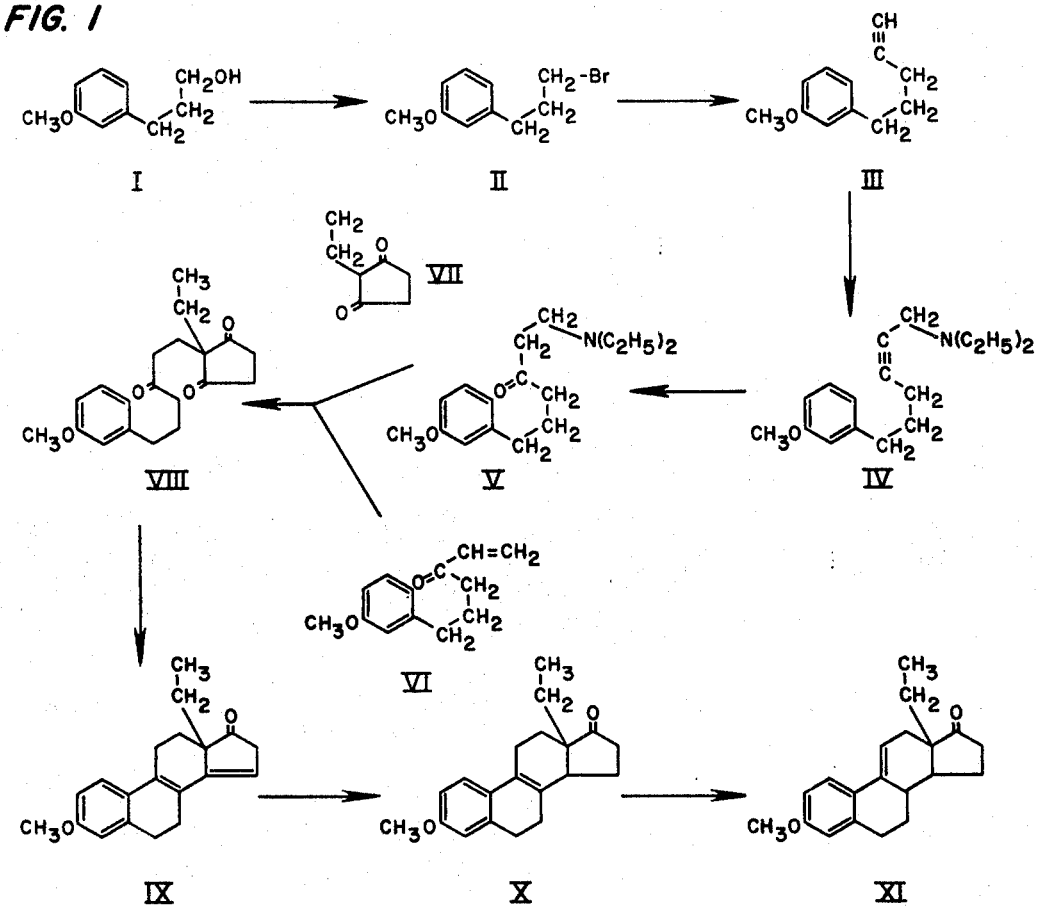
FIGURE 1 illustrates schematically the reaction sequence for preparing a 13-alkylgona-1,3,5(10),9(11)-tetraene, specifically 13β-ethyl-3-methoxygona-1,3,5(10),9(11)-tetraen-17-one.

The invention sought to be patented, in a principal composition aspect, is described as residing in the concept of a chemical compound having the gona-1,3,5(10),9(11)-tetraene nucleus and having attached thereto in the 13-position a monovalent polycarbon-alkyl radical.

The tangible embodiments of the composition aspect of the invention possess the inherent general physical properties of being white crystalline solids, are substantially insoluble in water and are generally soluble in polar solvents such as dimethylacetamide. Examination of compounds produced according to the hereinafter described process reveals, upon ultraviolet and infrared spectrographic analysis, spectral data supporting the molecular structures herein set forth. The aforementioned physical characteristics, taken together with the nature of the starting materials and the mode of synthesis, confirm the structure of the compositions sought to be patented.

The tangible embodiments of the invention possess the inherent applied use of characteristics of exerting qualitatively varying hormone effects in animals as evidenced by pharmacological evaluation according to standard test procedures. Such tangible embodiments show estrogenic and blood lipid lowering effects, and these findings indicate their usefulness in the treatment of female hypogonadism, amenorrhea, dysmenorrhea, ovulation block, functional uterine bleeding, acne, arteriosclerosis, osteoporosis, hormone dependent tumors, infertility, and in contraception. In particular, it has been established that alterations of the natural steroid structure made possible by our discovery result not merely in a change of degree of hormonal activity but, as a result of the separation of types of hormonal activity, alter in an unexpected way its basic nature so that a desirable hormone effect is maximized and an undesirable hormone effect is minimized.

In addition to their inherent applied use characteristics, the intermediate compositions of this invention are useful in practicing the process aspect of the present invention in the making of the principal gonane compositions of the invention according to the sequence of reactions described herein.

The invention sought to be patented, in a principal process of making the compositions aspect, is described as residing in the concept of the sequence of reactions including: converting a compound having a 5-phenyl-pent-1-yne nucleus, ring-unsubstituted in at least one position ortho to the point of chain attachment, by means of a Mannich type reaction, to its acetylenic amine derivative; hydrating the acetylenic linkage to form a 3-keto compound; reacting such 3-keto substrate compound with a nucleophilic 2 - monovalent alkyl - 1,3 - dioxocyclopentano compound under Michael condensation conditions to attach the cyclopentano compound through its 2-position carbon atom to the 1-position carbon atom of the 3-keto compound; treating the bicyclic triketone formed in the preceding step with an acidic dehydrating agent thereby to effect a double cyclodehydration to form a 1,3,5(10),8,14-pentadehydro-13-alkylgonane, and thereafter selectively saturating the 14(15) double bond of said gonane with hydrogen in the presence of a catalyst and isomerizing the 8(9) double bond of the product under acidic conditions.

Figure 3:
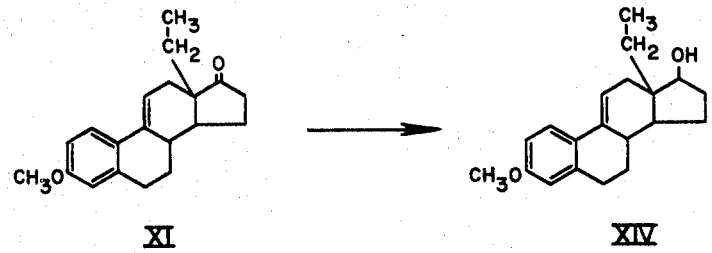
FIGURE 3 illustrates schematically the reduction of a 13-alkylgona-1,3,5(10),9(11)-tetraen-17-one to prepare a 13-alkylgona-1,3,5(10),9(11)-tetraen-17β-ol, specifically 13β - ethyl - 3 - methoxygona - 1,3,5(10),9(11) - tetraen-17β-ol from 13β-ethyl-3-methoxygona-1,3,5(10),9(11)-tetraen-17-one.

The invention sought to be patented in a sub-generic composition aspect is described as residing in the concept of a 13-alkylgona-1,3,5(10),9(11)-tetraen-17-ol (FIGURE 3, XIV), of which a specific embodiment in which the alkyl group is 13β-ethyl is hereinafter described.

The tangible embodiments of said sub-generic composition aspect possess the use characteristic of varying hormone effects in animals, as evidenced by pharmacological evaluation by standard test procedures, and in particular in certain instances anti-atherogenic effects accompanied by unexpected separation of activities.

Figure 2:
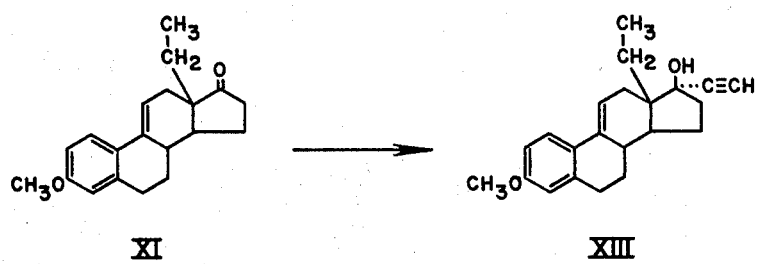
FIGURE 2 illustrates schematically the ethynylation of a 13-alkylgona-1,3,5(10),9(11)-tetraen-17-one to prepare a 13-alkylgona-1,3,5(10),9(11)-tetraen-17-ol, specifically 13β - ethyl - 17α - ethynyl - 3 - methoxygona - 1,3,5(10),9(11)-tetraen-17β-ol from 13β-ethyl-3-methoxygona-1,3,5(10),9(11)-tetraen-17-one.

The invention sought to be patented in a second process aspect is described as residing in the concept of alkynylating a compound having a gona-1,3,5(10),9(11)-tetraen-17-one nucleus (FIGURE 2, XI) and obtaining the corresponding 17α-alkynylgona-1,3,5(10),9(11)-tetraen-17β-ol (FIGURE 2, XIII).

Figure 4:
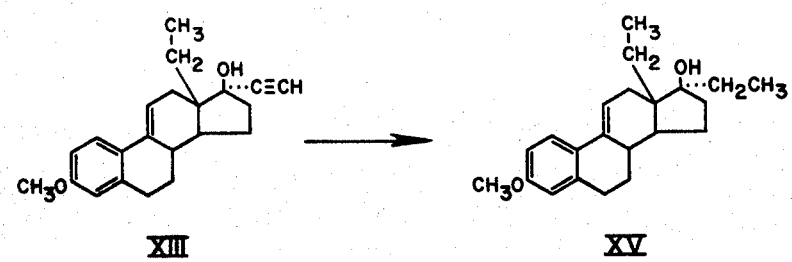
FIGURE 4 illustrates schematically the selective hydrogenation of a 13-alkyl-17-ethynylgona-1,3,5(10),9(11)-tetraene to prepare a 13,17-diethylgona-1,3,5(10),9(11)-tetraene, specifically 13β,17α-diethyl-3-methoxygona-1,3,5(10),9(11)-tetraen-17β-ol from 13β-ethyl-17α-ethynyl-3-methoxygona-1,3,5(10),9(11)-tetraen-17β-ol.

The invention sought to be patented in a third process aspect is described as residing in the concept of selectively hydrogenating in the presence of a catalyst a 17α-alkynylgona-1,3,5(10),9(11)-tetraen-17β-ol (FIGURE 4, XIII)

to obtain a 17α-alkylgona-1,3,5(10),9(11)-tetraen-17β-ol (FIGURE 4, XV).

Figure 5:
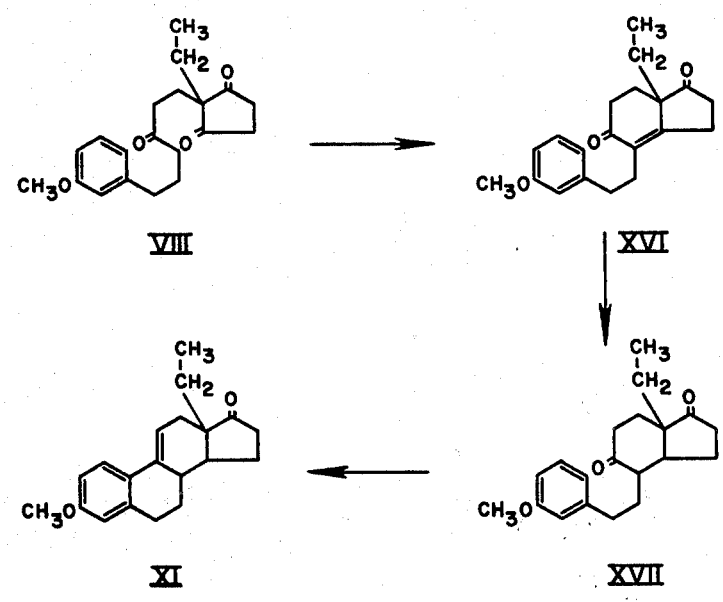
FIGURE 5 illustrates schematically the reaction sequence for preparing a 13-alkylgona-1,3,5(10),9(11)-tetraene from a 2-alkyl-2-(6-phenyl-3-oxohexyl)-1,3-cyclopentane-1,3-dione, specifically 13β-ethyl-3-methoxygona-1,3,5(10),9(11)-tetraen-17-one.

The invention sought to be patented in a fourth process aspect, as illustrated in annexed FIGURE 5, is described as residing in the concept of a sequence of reactions to form the gonane structure with the natural configuration of hydrogen atoms at the 8 and 14-positions including: treating the bicyclic ketone formed in the Michael reaction of a 3-keto substrate compound with a nucleophilic 1,3-dioxocyclopentano compound having at least one hydrogen at the 2-position (VIII) under aldol condensation conditions, i.e., in the presence of a basic catalyst, and if a suitable activating substituent is not present on the aromatic ring, in the presence of an acid catalyst, to form the tricyclic diketone (XVI): reducing the C-ring unsaturation to form Compound XVII (by whatever mechanism the hydrogen at the 8-position is introduced, it can on treatment with an acid or base take up the most stable configuration, i.e., the position trans to the other newly introduced hydrogen, by equilibrating through keto-enol tautomerism with the adjacent keto; thus when the first is α, having been introduced trans to the 13-substituent by stereospecific means, the 8-carbon will be β so that the natural configuration results) and closing the B-ring under acidic conditions at low temperature to form compound XI.

The manner of making the chemical compounds which are the starting materials for use in making the compounds of the invention, and for use in the processes of making the invention, are illustrated in copending application Ser. No. 228,384 filed Oct. 4, 1962.

The manner and process of making and using the invention will now be generally described so as to enable a person skilled in the art of chemistry to make and use the same, as follows:

Referring now to FIGURE 1, wherein the compounds are assigned Roman numerals for identification schematically, the sequence of reactions involved in the synthesis of a specific embodiment, namely, 13β-ethyl-3-methoxygono-1,3,5(10),9(11)-tetraen-17-one, is illustrated. 3-(m-Methoxyphenyl)propanol (I) is heated with phosphorus tribromide in benzene after dropwise addition in the cold to form 3-(m-methoxyphenyl)-propyl bromide (II). This halogen compound (II) dissolved in tetrahydrofuran is condensed with sodium acetylide in liquid ammonia to obtain 5-(m-methoxyphenyl)-1-pentyne (III). Compound III is allowed to stand under nitrogen with water, 30% formalin, acetic acid, diethylamine, dioxan, and cuprous chloride at 70° C. for about 12 hours, whereby there is obtained 1-diethylamino-6-(m-methoxyphenyl)-2-hexyne (IV), which is in turn hydrated in the presence of a mercury salt and sulfuric acid to form 1-diethyl-amino-6-(m-methoxyphenyl)-3-hexanone (V). The ketamine (V) may eliminate diethylamine on distillation to give the vinyl ketone 6-(m-methoxyphenyl)-1-hexen-3-one (VI). Either the ketamine (V) or the ketone (VI), or mixtures thereof, is then reacted with 2-ethyl-1,3-cyclopentanedione (VII) under Michael condensation conditions, e.g., refluxing in methanolic potassium hydroxide to form 2-ethyl-2-[6-(m-methoxyphenyl)-3-oxohexyl]-1,3-cyclopentanedione (VIII).

Compound VIII is then cyclodehydrated at the reflux temperature of a solvent, such as benzene, in the presence of a dehydrating acid, such as p-toluene sulfonic acid, to effect simultaneous ring closures to give the tetracyclic compound 13β-ethyl-3-methoxygona-1,3,5-(10),8,14-pentaen-17-one (IX). The 14-unsaturation of Compound IX is then selectively hydrogenated in the presence of a metal catalyst, such as 2% palladized calcium carbonate, to form 13β-ethyl-3-methoxygona-1,3,5(10),8-tetraen-17-one (X). Compound (X) is then isomerized by treating with a strong acid such as hydrochloric or p-toluenesulfonic acid to form 13β-ethyl-3-methoxygona-1,3,5(10),9(11)-tetraen-17-one (XI).

Referring now to FIGURE 2 wherein the compounds are assigned Roman numerals for identification schematically, a specific embodiment of the invention, 13β-ethyl-17α-ethynyl-3-methoxygona-1,3,5(10),9(11)-tetraen-17β-ol (XIII) is formed by ethynylating 13β-ethyl-3-methoxygona-1,3,5(10),9(11)-tetraen-17-one with an alkali metal acetylide or an acetylenic Grignard reagent.

Referring now to FIGURE 4, another specific embodiment of the invention, 13β,17α-diethyl-3-methoxygona-1,3,5(10),9(11)-tetraen-17β-ol (XV) is formed by selectively hydrogenating in the presence of a metal catalyst 13β-ethyl-17α-ethynyl-3-methoxygona-1,3,5(10),9(11)-tetraen-17β-ol (XIII) until the acetylenic group is saturated with hydrogen.

Referring now to FIGURE 5, wherein the compounds are assigned Roman numerals for identification schematically, the sequence of reactions involved in an alternate process for cyclizing the 2-alkyl-2-(6-phenyl-3-oxohexyl)-1,3-cyclopentanedione to obtain the tetracyclic 13-alkylgona-1,3,5(10),9(11)-tetraene is illustrated. Internal aldol condensation and dehydration of 2-ethyl-2-[6-m-methoxyphenyl)-3-oxohexyl]-1,3-cyclopentanedione (VIII) forms 8-ethyl-5,6,7,8-tetrahydro-4-m-methoxyphenethylindane-1,5-dione. The newly formed unsaturation of Compound XVI is hydrogenated to form 8-ethylhexahydro-4-m-methoxyphenethylindane-1,5-dione (XVII). B-ring closure of Compound XVII proceeds at room temperature under acid conditions to form 13β-ethyl-3-methoxygona-1,3,5(10),9(11)-tetraen-17-one (XI).

While the hereinbefore described processes produce novel and steroidal-like compounds which have an unnatural substituent at the 13-position, it is apparent that the novel and valuable processes of the invention offer a unique feasible route to the corresponding natural steroids if the nucleophilic compound used in the Michael condensation step is 2-methyl-1,3-cyclopentanedione.

The aromatic ring of the phenylpropanol (FIGURE 1, I) used as the starting material for the preparation of the compositions and initial preparations of the invention may have one or more substituents, provided, however, at least one position ortho to the position of propanol-chain attachment is unsubstituted so that cyclodehydration to form a cyclic structure can eventually be effectuated. To activate such ortho position for said subsequent ring closure, a para-directing group (referring to electrophilic aromatic substitution) such as hydroxy, acyloxy, alkoxy, amino, alkylamino, or acylamino is a necessary substituent on the aromatic ring. The group may be present initially or may be introduced later but before ring closure, either directly, or by conversion from a meta-directing group such as nitro. The term "para-directing group" (referring to electrophilic aromatic substitution) as used herein means an activating group such as those hereinbefore listed and which activates all positions on the aromatic nucleus. Thus, if the group is para-directing, as defined above, it can be in a position meta to the ortho position to which ring closure is limited by steric considerations, said position being activated even though another position is more highly activated. Ring closure could not occur at the said more highly activated position because of the above-mentioned steric limitations. For the processes of the invention and except for the limitations expressed in this specification, variations of the substituents on the A-ring of the fully formed tetracyclic structures, or the intermediates leading thereto, are full equivalents of each other. After the tetracyclic structure has been formed, substituents can be introduced into the aromatic A-ring which are not limited as above; however, if such substituted compound is to undergo a reduction, the group is preferably one not sensitive to reduction. For the processes of the invention and except for the limitations expressed in this specification, variations of the substituents on the A-ring of the fully formed tetracyclic structures, or on the intermediates leading thereto, are full equivalents of each other.

The carbon atom to which the phenyl group of the starting propanol (I) is attached can be substituted, as, for example, with an alkyl group, such as methyl or ethyl. This atom will appear in the tetracyclic structures of the invention in the 6-position.

When the nucleophilic compound is 2-methyl-1,3-cyclopentenedione, the invention provides a unique total synthesis for natural steroids: the hydrogens at the 8-position, 9-position, and 14-position being β, α, and α, respectively, as in the natural steroids. Thus such valuable therapeutic substances as estrone, estradiol, and 19-nortestosterone are made available from easily obtainable and relatively simple and inexpensive starting materials.

Moreover, by varying the group at the 2-position of the nucleophilic Michael condensation reactant, the invention provides a way to produce compounds resembling the natural steroids save at the 13-position.

The starting materials for the preparation of the 2-substituted 1,3-cyclopentanediones are ketones of the structure $RCH_2COCH_3$, where R is the substituent which will appear at the 2-position of the 1,3-cyclopentanediones. The starting ketone is reacted with diethyl oxalate in the presence of base to form a cyclopentane-1,3,4-trione-5-glyoxylic ester substituted at position 2 with the group R present in the starting ketone. The product is treated with acid to remove the 5-substituent, and the 4-ketone function is then removed by Wolff-Kishner reduction, involving selective semicarbazone formation at $C_4$ and heating the product with base such as sodium hydroxide. On acidification the required 2-substituted-1,3-cyclopentane dione can be isolated. Thus, the group R, which eventually forms the 2-substituent of the 1,3-cyclopentane dione, can be any organic group which is stable to acid and to Wolff-Kishner condition and can be methyl, ethyl, propyl, cetyl, diethylaminoethyl, etc. Thus, by varying the substituent at the 2-position of the 1,3-cyclopentanedione, alkyl groups of varying chain length such as, for example, ethyl, isopropyl, cetyl, etc., may be introduced to form the gonane correspondingly substituted at the 13-position.

The 2-carbon atom of the starting phenyl-propanol (I) can also be substituted, as, for example, with an alkyl group, such as methyl and ethyl, and, as such, be unchanged throughout the subsequent synthesis. In the tetracyclic structures of the invention this carbon atom will appear in the 7-position.

For the processes of the invention and except for the limitations expressed in this specification, variations of the B-ring on the fully formed tetracyclic structures, or on the intermediates leading thereto, are full equivalents of each other.

In the Michael reaction step, the 3-keto substrate compound can be a 6-phenyl-1-hexen-3-one, or alternatively, a 6-phenyl-3-hexanone having attached to the 1-position a group which will eliminate with hydrogen to form a 6-phenyl-1-hexen-3-one under Michael conditions. Thus, a 3-keto compound with a 1-dialkylamino substituent or its quaternary salt, a 1-halo substituent, or a 1-hydroxy substituent will react with the nucleophilic compound to the Michael product. The nucleophilic compound can be a carbocyclic-1,3-dione of varying ring size, as for example, a five-membered ring, a six-membered ring, etc., ultimately forming a corresponding five-membered, a six-membered, etc., D-ring in the tetracyclic structure. The 1,3-cyclodione may also contain a hetero atom at positions other than position 2, thereby to provide a heterocyclic D-ring in the tetracyclic structure. Acylic nucleophilic compounds can be used in conducting the Michael reaction step and the open-chain of the resulting product thereafter ring-closed to form a cyclic D-ring.

For the processes of the invention, and except for the limitations expressed in this specification, variations of the D-ring on the fully formed tetracyclic structure, or on the intermediates leading thereto, are full equivalents of each other. Further, gonanes may be prepared wherein the 13-position is substituted with any organic radical. Thus, but without limiting the generality of the foregoing, an aralkyl, cycloalkylalkyl, or a polycarbon-alkylene bridge bearing a hydroxy-, amino-, or alkylamino-, substituent can readily be placed in the 13-position, and from such compounds other variations of the 13-position substituent can be prepared, as haloalkyls from hydroxyalkyls, or quaternary salts, amides, alkenyls, etc. from aminoalkyls.

For the processes of the invention and except for the limitations expressed in this specification, variations at the 13-position of the fully formed tetracyclic structures or on the intermediates leading thereto are the full equivalents of the claimed 13-position polycarbon-alkyl substituents, having physiological activity of the same type.

In any of the intermediate structures or in the tetracyclic structures of the invention wherein the 17-position, or position corresponding thereto in the gonane nucleus, is carbonyl, the carbonyl group can be converted to a group such as hydroxymethylene by lithium aluminum hydride reduction; to acyloxymethylene by esterification of the hydroxymethylene group so formed; to alkoxymethylene by etherification of the hydroxymethylene group; to alkyl hydroxymethylene by addition of the appropriate organometallic reagent to the carbonyl; or to alkynylhydroxymethylene by addition of the appropriate alkali metal acetylide in a suitable insert solvent; all in the known manners. The carbonyl group may also be ketalized or thioketalized by treating with the appropriate alcohol or glycol, in a suitable solvent under acidic conditions, as in the presence of an acid such as sulfuric acid, p-toluene acid, or boron trifluoride etherate, with heating where necessary, according to the known art.

The specific reactions involved in the processes of the invention will now be considered, as follows, reference being made to the drawings for typifying compounds:

The vinyl ketones (VI) are prepared by elimination of dialkylamine from the corresponding dialkylaminoethyl aminoketones (V), obtained by hydration of the acetylenic linkage in an acetylenic amine (IV). The acetylenic amines (IV) can be themselves prepared by a Mannich reaction from the corresponding acetylene (III) with formaldehyde and a dialkylamine. The hydration can be carried out, for example, in aqueous sulfuric acid with mercuric sulfate as a catalyst. The corresponding quaternary salts, which may also be used in the subsequent Michael condensation, can be obtained by quaternization of the corresponding acetylenic dialkylaminoethyl amine, followed by hydration, or by quaternization of the corresponding acetylenic dialkylaminoethyl amine, followed by hydration, or by quaternization of the ketoamine. The vinyl ketones can be prepared from these derivatives by the above elimination reaction. Thus the ketoamine or its quaternary salt can be treated with a base for this purpose, for example, with sodium hydroxide or a sodium alkoxide.

The vinyl ketones (VI) and dialkylamino ketones (V) are condensed with a nucleophilic compound under Michael reaction conditions. Thus the condensation can be carried out by bringing the two reagents together in solution in the presence of a base, for example, pyridine, triethylamine, diethylamine, sodium hydroxide, or sodium methoxide, and heating as required. The nature and amount of base employed in the condensation reaction will depend upon the particular reagents used. Where the vinyl ketone derivative employed is a keto-amine and dialkylamine is eliminated in the reaction, no added base may be required. Where the compound is a 2-alkylcyclopentane-1,3-dione (VII), the compound to be condensed with it is preferably a vinyl ketone, and the dione is used in excess of the molecular equivalent quantity. Suitable solvents are hydrocarbons, such as benzene, and anhydrous alcohols, such as methanol. If the reaction is carried out in benzene under refluxing conditions, water formed in the condensation may be azeotroped out of the reaction mixture with a Dean-Stark type trap.

As hereinbefore noted, monocyclodehydration of the

C-ring is accomplished by an internal aldol condensation. The cyclodehydration can therefore be carried out using conditions generally applicable for an aldol condensation, i.e., in the presence of an acid or basic catalyst such as NaOH, p-toluene sulfonic acid, triethylamine benzoate, aluminum tertiary butoxide, and the like, either at room temperature or accompanied by heating if necessary. In most instances, we prefer to carry out the cyclic dehydration at the boiling point of the solvent to permit azeotropic removal of the water formed during the course of the reaction, inasmuch as the aldol reaction is a reversible one. Preferred as solvents are the low boiling anhydrous aromatic hydrocarbons, such as benzene and xylene C-ring closure occurs regardless of the nature of the substitution on the aromatic ring.

The reduction of the 8(14) unsaturation in the tricyclic compounds is carried out by catalytic hydrogenation either at room temperature or above. It is found that when hydrogen and a palladium-on-charcoal catalyst are used, the hydrogen introduced at the carbon 14-position is principally in the configuration trans to the group attached at the 13-position. By whatever mechanism the hydrogen at the 8-position is introduced, it can on treatment with an acid or base take up the most stable configuration, i.e., the position trans to the other newly introduced hydrogen, by equilibrating through keto-enol tautomerism with the adjacent keto group. Thus the second hydrogen atom can be made to take up the β-configuration when the first is α.

The configuration of the hydrogen atom introduced by palladium hydrogenation at the 14-carbon has been independently proved by reducing the keto group of Compound XVIII.

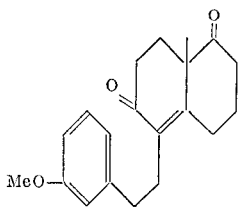

XVIII at the 17a-position (steroid enumeration) using sodium borohydride, a method selective for that position while leaving the other keto group untouched, and then reducing the resulting keto-alcohol (XIX)

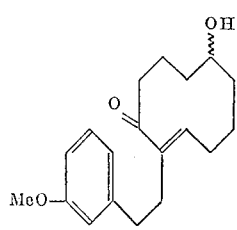

XIX with lithium in liquid ammonia, a method stereospecific for the introduction of a hydrogen at $C_{14}$ trans to the angular substituent at $C_{13}$ in XX

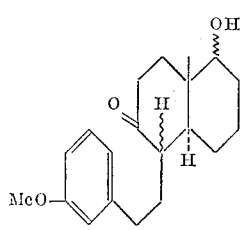

XX followed by oxidation of the reduced keto-alcohol using chromium trioxide in an organic medium to give a crystalline diketone (XXI)

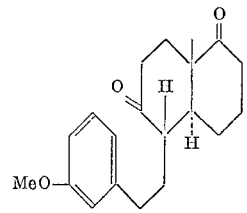

XXI which is converted by methanolic hydrochloric acid to the tetracyclic ketone (XXII), identical to that prepared by the hydrogenation of the

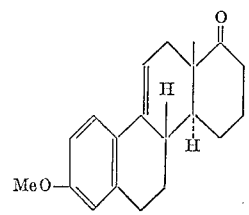

XXII 8,14 double bond compound XVIII followed by acid cyclodehydration, whose structure was determined by reduction of the 9(11) double bond and conversion to the known benzylidene derivative.

The B-ring closure is brought about under acidic conditions. Suitable are strong acids such as sulfuric, hydrochloric, p-toluene sulfonic, etc. in solvents such as benzene, toluene, anhydrous alcohol, etc. The reaction is generally carried out at room temperature or below since heat may promote the formation of an aromatic B-ring. The preferred treatment is with methanolic hydrochloric acid at room temperature. As hereinbefore noted, it has been found that the ease of B-ring closure of the compounds of the invention to form tetracyclic compounds is affected by the nature of the substituent present on the preformed aromatic A-ring, and that subsequent cyclization is easier to carry out when the preformed aromatic A-ring contains a substituent which activates the position at which cyclization is to occur. Where a compound is to be used directly for B-ring closure, it will in practice be one containing such a substituent. Those substituents which cause subsequent B-ring closure to occur readily are substituents para to the position of ring closure which are groups that in electrophilic aromatic substitution activate an aromatic ring and are predominantly o- and p-directing; for example, the hydroxy or alkoxy group.

The double cyclodehydration is brought about by dissolving a compound typified by Compound VIII in benzene containing a catalytic amount of p-toluene sulfonic acid and boiling the mixture under a Dean-Stark trap until two equivalents of water have been collected, or alternatively, by treating the same triketone with polyphosphoric acid at room temperature or slightly above until ring closure is complete.

The selective hydrogenation of the gona-1,3,5(10),8,14-pentaenes typified by Compound IX is carried out by means of 2% palladized calcium carbonate. As hereinbefore noted, suprisingly, the catalytic hydrogenation results in addition of hydrogen to the 14-double bond in such a way as to give the "natural" stereochemical configuration; that is, the hydrogen adds at 14-trans to the alkyl at 13. Selective reduction of the 14-ethylenic linkage is achieved by use of catalyst-solvent combination which shows adequate selectivity, and stopping the hydrogenation when the theoretical amount of hydrogen has reacted. Solvents showing selectivity in this regard are the non-protonic solvents, that is, hydrocarbons and ethers; benzene, toluene, naphtha, dioxan, dibutyl ether, and diethyl ether are examples of suitable nonprotonic solvents. On the other hand, protonic solvents such as acetic acid and ethanol appear to be largely non-selective.

It has been found that a moderately active Raney nickel catalyst provides good selectivity in a suitable solvent. If a Raney nickel catalyst of low activity is employed, the hydrogenation may be too slow to be useful; on the other hand, a vigorous catalyst shows poor selectivity, and some saturation of the 8,9-ethylenic bond may occur simultaneously with the hydrogenation at the 14,15-position.

If desired, other moderately active hydrogenation catalysts may be used instead of Raney nickel; for example, palladium on barium sulfate or on alkaline earth metal carbonate or on charcoal have all been found suitable in this selective hydrogenation.

Isomerization of the 8(9) bond of the gona-1,3,5(10), 8-tetraenes to the 9(11)-position is brought about by treating a solution of the compound in a solvent with a strong acid, with heating as required. Thus hydrochloric acid in ethanol or p-toluenesulfonic acid in benzene are suitable systems to effect isomerization.

While the tetracyclic compounds in this specification and the appended examples are named to describe the configuration corresponding to that of the natural steroids, it is to be understood that unless otherwise indicated, the product of each of the given manipulative procedures is a racemic mixture which contains said named compound and its enantiomorph.

Representative formulations embodying specific compositions of this invention follow:

A pharmaceutical tablet for use as an oral anti-atherogenic agent consists of the following ingredients:

|  | Mg. |
|---|---|
| 3-benzyloxy-13β-ethylgona-1,3,5(10),9(11) - tetraen-17β-ol | 25 |
| Carboxymethylcellulose (viscosity 400 cps.) | 15 |
| Lactose powder | 25 |
| Redried corn starch | 25 |
| Magnesium stearate powder | 4 |
| Calcium silicate powder, q.s. | |
| | 200 |

A capsule for use as an oral anti-atherogenic agent contains, in encapsulating gelatin, the following ingredients:

|  | Mg. |
|---|---|
| 3-benzyloxy-13β-ethylgona-1,3,5(10),9(11) - tetraen-17β-ol | 25 |
| Finely divided silica lubricant | 5 |
| Magnesium stearate powder | 5 |
| Powdered corn starch | 113 |
| Lactose powder, q.s. | |
| | 245 |

Pharmaceutically acceptable carriers can be either solid or liquid. Solid form preparations include powders, tablets, dispersible granules, capsules, cachets, and suppositories. A solid carrier can be one or more substances which may also act as diluents, flavoring agents, solubilizers, lubricants, suspending agents, binders, or tablet-disintegrating agents: it can also be an encapsulating material. In powders the carrier is a finely divided compound. In the tablets the compound is mixed with carrier having the necessary binding properties in suitable proportions and compacted in the shape and size desired. The powders and tablets, preferably contain from 5 or 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethylcellulose, a low melting wax, and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets, and capsules can be used for oral administration.

Liquid form preparations include solutions, suspensions, and emulsions. The compounds are insoluble in water, but can be dissolved in aqueous-organic solvent mixtures that are non-toxic in the amounts used. As an example may be mentioned water-propylene glycol solutions for parenteral injection. Liquid preparations can also be formulated in solution in aqueous polyethylene glycol solutions. Aqueous suspension suitable for oral use can be made by dispensing the finely divided compound in water with viscous material, natural or synthetic gums, resins, etc., for example, gum arabic, ion-exchange resins, methylcellulose, sodium carboxymethylcellulose and other well-known suspending agents.

Preferably the pharmaceutical preparation is in unit dosage form. In such form, the preparation is sub-divided in unit doses containing appropriate quantities of the compound: the unit dosage form can be a packaged preparation, the package containing discrete quantities of preparation, for example, packeted powders of vials or ampules. The unit dosage form can be a capsule, cachet, or tablet itself, or it can be the appropriate number of any of these in packaged form. The quantity of compound in a unit dose of preparation may be varied or adjusted from 1 mg. to 100 mg. (generally within the range of 2.5 to 25 mg.) according to the particular application and the potency of the active ingredient.

The claimed compositions having physiological activity can be incorporated into pharmaceutical formulations including sustained-release agents.

The following preparations illustrate the manner of making the chemical compounds which are the starting materials for use in the processes of the invention.

Preparation 1.—3-(3-methoxyphenyl)-n-propyl bromide

Cool 3-(3-methoxyphenyl)propan-1-ol (125 g.) in benzene (200 cc.) to 0° and add a solution of phosphorus tribromide (86 g.) in benzene (150 cc.) dropwise so that the temperature of the mixture does not rise above 5°. Keep the mixture at 0° for 1 hour and then heat at 60° for 3 hours. Cool, pour onto ice, dilute with ether and separate the organic layer. Wash the organic solution with 3 N aqueous sodium hydroxide, water and dry. Remove the solvent and distil the residue to obtain the title compound (131 g.), B.P. 146–148°/17 mm. $n_D^{18}$ 1.5497.

$C_{10}H_{13}Br$, calculated: C, 52.4%; H, 5.7%; Br, 34.8%. Found: C, 54.4%; H, 5.7%; Br, 34.7%.

Preparation 2.—5-m-methoxyphenylpent-1-yne

Add 3-(3-methoxyphenyl)-n-propyl bromide (14 g.) in tetrahydrofuran (15 cc.) with rapid stirring to a solution of sodium acetylide (from 1.84 g. sodium) in liquid ammonia (125 cc.) in a Dewar flask. Continue stirring for 22 hours, then add ammonium chloride (3 g.) and water (50 cc.). Collect the product with ether and wash and dry the ethereal solution. Distil to obtain 5-m-methoxyphenylpent-1-yne (7.1 gr., 66%), B.P. 75–78° C./0.06 mm. Hg.

$C_{12}H_{14}O$, calculated: C, 82.7%; H, 8.1%. Found: C, 82.2%; H, 7.8%.

Preparation 3.—1-diethylamino-6-m-methoxyphenyl-hex-2-yne

Allow 5-m-methoxyphenylpent-1-yne (8 g.) to stand for 21 hours at 70° C. under nitrogen with water (2.5 cc.), trioxan (0.5 g.), 30% formalin (5.5 g.), diethylamine (4 g.), acetic acid (2.75 g.), dioxan (25 cc.) and cuprous chloride (0.13 g.). Make the cooled solution alkaline with 10% aqueous sodium hydroxide and extract with ether; then extract the ether extract with 10% hydrochloric acid; wash the acid extract with ether, basify and extract with ether, and then wash and dry the ether extract. Distil to obtain 1-diethylamino-6-m-methoxyphenyl-hex-2-yne (10.6 g., 885), B.P. 130–131° C./0.1 mm.

$C_{17}H_{25}N$, calculated: C, 78.7%; H, 9.7%. Found: C, 78.9%; H, 9.6%.

Preparation 4.—1-diethylamino-6-m-methoxyphenyl-hexan-3-one and 6-m-methoxyphenylhex-1-en-3-one Add mercuric sulphate (0.45 g.) to a swirled solution of 1-diethylamino-6-m-methoxyphenylhex-2-yne (8.5 g.) in concentrated sulphuric acid (2.5 cc.) and water (25 cc.). Keep the solution under nitrogen at 75° C. for 1 hour, then cool, make basic with 10% aqueous sodium hydroxide, and filter through glass wool to remove mercuric oxide. Extract product with ether and wash and dry the ethereal solution. Remove the solvent to obtain the crude ketoamine 1-diethylamino-6-m-methoxyphenylhexan-3-one, infrared absorption peak at $1710\mu$. Distil under reduced pressure with partial elimination of diethylamine, to obtain a mixture of the ketoamine 1-diethylamino-6-m-methoxyphenylhexan - 3 - one and the vinyl ketone 6 - m - methoxyphenylhex-1-en-3-one (7.1 g., ca. 76%), B.P. 140–145° C./0.1 mm.; infrared absorption peaks at 5.85 and $5.95\mu$, the ketoamine predominating.

Preparation 5.—2-(6-m-methoxyphenyl-3-oxohexyl)-2-ethylcyclopentane-1,3-dione

Reflux a mixture (5.25 g.) of 1-diethylamino-6-m-methoxyphenylhexan-3-one and 6-m-methoxyphenylhex-1-en-3-one with 2-ethylcyclopentane-1,3-dione (3.3 g.) in dry 0.12% methanolic solution of potassium hydroxide for 18 hours. Filter the resulting solution, evaporate to dryness and dissolve in the residue in ether. Wash the ether solution with alkali, hydrochloric acid, and water, dry and evaporate to obtain as residue the triketone 2-(6-m-methoxyphenyl-3-oxohexyl)-2-ethylcyclopentane - 1,3 - dione (7.1 g.) as a gum.

Preparation 6.—13β-ethyl-3-methoxygona-1,3,5(10),8,14-pentaen-17-one

Reflux the triketone 2 - ethyl-2-(6-m-methoxyphenyl-3-oxo-hexyl)cyclopentane-1,3 - dione (7.1 g.), in benzene (150 cc.) and toluene-p-sulphonic acid (2 g.) until the theoretical amount of water (0.72 cc.) for double cyclodehydration has been collected in a Dean-Stark separator. Wash the cooled reaction mixture after removal of solvent under reduced pressure, B.P. ca. 220°/0.01 mm., to obtain an almost colorless glass (5.7 g.). Crystallize the glass from methanol containing a little ethyl acetate to obtain pure 13β-ethyl-3 - methoxygona - 1,3,5(10),8,14-pentaen-17-one (3.7 g.), M.P. 77–80°; ultraviolet absorption peak at 311 m$\mu$ ($\epsilon$ 28,000).

$C_{20}H_{22}O_2$, calculated: C, 81.6%; H, 7.5%. Found: C, 81.3%; H, 7.3%.

The following examples illustrate the manner of using the claimed processes of the invention for the preparation of the claimed compositions of the invention.

Example 1.—13β-methyl-3-methoxy-D-homogona-1,3,5(10),8-tetraen-17a-one

To 13β - methyl-3-methoxy-D-homogona-1,3,5(10),8,14-pentane-17a-one (0.3 g.) in dioxan (20 cc.) add a moderately active Raney nickel catalyst (ca. 0.2 g.). Hydrogenate at room temperature and atmospheric pressure until 24 cc. hydrogen has been absorbed. Filter off the catalyst and evaporate the filtrate to obtain a solid; recrystallize from a mixture of ethanol and ethyl acetate to obtain the title product (0.15 g.), M.P. 120–150° C. Ultraviolet absorption peak at 275 m$\mu$ ($\epsilon$ 14,000).

This compound has estrogenic activity, lowers the blood lipid level, and is useful as an intermediate for preparing the hormonal compounds of this invention.

Example 2.—13β-methyl-3-methoxygona-1,3,5(10),8-tetraen-17-one

Dissolve 13β-methyl-3 - methoxygona - 1,3,5(10),8,14-pentaen-17-one (1 g.) in dioxan (33 cc.). To the solution add Raney nickel catalyst (ca. 0.5 g.) which has been prepared by the method of Pavlic and Adkins, J. Amer. Chem. Soc., 1946, 68, 1471 and allow to stand for 24 hours. Hydrogenate at room temperature and pressure until the theoretical amount of hydrogen (92 cc.) for saturation of one ethylenic linkage has been absorbed. Towards the end of this period (5 hours) the rate of hydrogenation drops markedly. Evaporate the solvent after removal of catalyst to obtain a gum which readily crystallizes. Recrystallize once from ethanol to obtain the crude title product (0.69 g.), M.P. 110–120°; ultraviolet absorption peak at 278 m$\mu$ ($\epsilon$ 14,700).

This compound has estrogenic activity, lowers the blood lipid level, and is useful as an intermediate for preparing the hormonal compounds of this invention.

Example 3.—13β-methyl-3-methoxygona-1,3,5 (10),8-tetraen-17-one

Shake 13β - methyl - 3 - methoxygona-1,3,5(10),8,14-pentaen-17-one (1 g.) in benzene (35 cc.) with a 10% palladium on barium sulphate catalyst (0.3 g.) in the presence of hydrogen at atmospheric pressure until 90 cc. hydrogen has been absorbed. By the end of this period (1½ hours) the rate of hydrogenation will have slowed down. Filter the mixture and evaporate the solvent to obtain a gum which solidifies; recrystallize from ethanol to obtain the title product (0.68 g.), M.P. 110–120°; ultraviolet absorption peak at 278 m$\mu$ ($\epsilon$ 13,200).

This compound has estrogenic activity, lowers the blood lipid level, and is useful as an intermediate for preparing the hormonal compounds of this invention.

Example 4.—13β-ethyl-3-methoxy-D-homogona-1,3,5(10),8-tetraen-17a-one

Shake 13β-ethyl-3-methoxy-D-homogona - 1,3,5(10),8,14-pentaen-17a-one (1.175 g.) in tetrahydrofuran (100 cc.) with 2% palladium on calcium carbonate (0.5 g., prereduced) in an atmosphere of hydrogen until one molecular equivalent of hydrogen has been absorbed. Filter the catalyst; evaporate the solvent, recrystallize the residue from ethanol to obtain the title product (0.925 g.), M.P. 104–107°; ultraviolet absorption peak at 278 m$\mu$ ($\epsilon$ 15,680).

This compound has estrogenic activity, lowers the blood lipid level, and is useful as an intermediate for preparing the hormonal compounds of this invention.

Example 5.—13β-ethyl-3-methoxygona-1,3,5(10),8-tetraen-17-one

Dissolve 13β - ethyl - 3-methoxygona-1,3,5(10),8,14-pentaen-17-one (2 g.) in dioxan (50 cc.) containing Raney nickel (ca. 0.5 g.) of moderate activity and shake with hydrogen until 160 cc., the amount corresponding to one molecular proportion has been absorbed. Recrystallize the isolated product from methanol to obtain the title product (1.2 g.), M.P. 110–125°; ultraviolet absorption peak at 280 m$\mu$ ($\epsilon$ 13,200).

This compound has estrogenic activity, lowers the blood lipid level, and is useful as an intermediate for preparing the hormonal compounds of this invention.

Example 6.—13β-propyl-3-methoxygono-1,3,5(10),8-tetraen-17-one

Condense 2-propyl-1,3-cyclopentanedione (13.1 g.) in 0.12% methanolic potassium hydroxide solution (90 cc.) with 6-m-methoxyphenyl-hex-1-en-3-one (19.0 g.), to obtain crude 2 - propyl-2-(6-m-methoxyphenyl-3-oxohexyl) cyclopentane-1,3-dione (25.5 g.). Submit this Michael condensation product (23.4 g.) to double cyclodehydration; distil the product at $200°/10^{-4}$ mm. and crystallize the distillate from ethanol, to obtain the tetracyclic diene ketone, M.P. 82–84°; ultraviolet absorption peak at 310 m$\mu$ ($\epsilon$ 24,700).

Selectively hydrogenate the diene ketone (5 g.) in benzene solution with a palladium on calcium carbonate catalyst until sufficient hydrogen has been taken up to saturate the 14,15-ethylenic bond. Isolate the product (3.5 g.) as pink crystals from methanol, M.P. 111–113°.

This compound has estrogenic activity, lowers the blood lipid level and is useful as an intermediate for preparing the hormonal compounds of this invention.

Example 7.—13β-isopropyl-3-methoxygona-1,3,5(10),8-tetraen-17-one

Shake -13β - isopropyl - 3 - methoxygona-1,3,5(10),8,14-pentaen-17-one (2 g.) in dioxan (50 cc.) with a freshly prepared but moderately active Raney nickel catalyst (ca. 0.5 g.) in hydrogen at atmospheric pressure. When, after several hours the theoretical amount of hydrogen for half-hydrogenation (160 cc.) has been absorbed, filter off the nickel catalyst and remove the solvent by evaporation. Crystallize the residual gum from methanol to obtain the title product (1.2 g.), M.P. 85–100° C.; ultraviolet absorption peak at 280 mμ (ε 11,800).

This compound has estrogenic activity, lowers the blood lipid level and is useful as an intermediate for preparing the hormonal compounds of this invention.

Example 8.—13β-butyl-3-methoxygona-1,3,5(10),8-tetraen-17-one

Condense 2 - butyl-1,3-cyclopentanedione (2.8 g.) in 0.12% methanolic potassium hydroxide solution (8 cc.) with 6-m-methoxyphenyl-hex-1-en-3-one (5 g.) by heating the mixture at 80° for 10 hours. Evaporate the solvent under reduced pressure and heat the residue with toluene p-sulphonic acid (2 g.) in benzene (50 cc.) for 45 minutes using a Dean-Stark trap, to effect double cyclodehydration. Add ether to the cooled reaction mixture and evaporate the washed and dried ether solution; recrystallize the residue from ethanol to obtain the tetracyclic diene (1.9 g.), M.P. 53–55°; ultraviolet absorption peak at 312 mμ (ε 29,200).

Shake this tetracyclic diene (1.38 g.) in benzene (45 cc.) in hydrogen at atmospheric pressure with a previously reduced 2% palladium on calcium carbonate catalyst (0.5 g.). When 100 cc. hydrogen has been absorbed, discontinue the hydrogenation and filter off the catalyst. Evaporate solvent and recrystallize the residue from methanol to obtain the title product (1.02 g.)., M.P. 105–108°; ultraviolet absorption peak at 278 mμ (ε 16,700).

This compound has estrogenic activity, lowers the blood lipid level, and is useful as an intermediate for preparing the hormonal compounds of this invention.

Example 9.—13β-isobutyl-3-methoxygona-1,3,5(10),8-tetraen-17-one

To a pre-reduced suspension of 2% palladium on calcium carbonate catalyst (7.0 g.) in benzene (30 cc.) add a solution of 13β - isobutyl-3-methoxygona-1,3,5(10),8,14-pentaen-17-one (20.0 g.) in benzene (500 cc.) and hydrogenate the mixture at atmospheric pressure until one mole equivalent of hydrogen is consumed. After the catalyst is removed by filtration, evaporate the solvent to obtain a gum which on crystallization from ethanol affords the title product (17.1 g.; 71%), M.P. 117–119°; ultraviolet absorption peak at 278 mμ (ε 14,560).

To prepare 6,13β - dimethyl - 3 - methoxygona-1,3,5(10),8 - tetraen-17-one hydrogenate 6,13β-dimethyl-3-methoxygona-1,3,5(10),8,14-pentaen-17-one over a 2% palladium on calcium carbonate catalyst in benzene according to the manipulative procedure described above.

To prepare 7,13β - dimethyl - 3 - methoxygona-1,3,5(10),8 - tetraen-17-one hydrogenate 7,13β-dimethyl-3-methoxygona-1,3,5(10),8,14-pentaen-17-one over a 2% palladium on calcium carbonate catalyst in benzene according to the manipulative procedure described above.

To prepare 13β-ethyl-1,3-dimethoxygona-1,3,5(10),8-tetraen - 17 - one hydrogenate 13β-ethyl-1,3-dimethoxy-1,3,5(10),8,14-pentaen-17-one over a 2% palladium on calcium carbonate catalyst in benzene according to the manipulative procedure described above.

To prepare 13β - ethyl - 3-methoxygona-1,3,5(10),8-tetraen - 17-one hydrogenate 13β-ethyl-acetoxygona-1,3,5(10),8,14-pentaen-17-one over a 2% palladium on calcium carbonate catalyst in benzene according to the manipulative procedure described above.

To prepare 13β - (3-hydroxypropyl)-3-methoxygona-1,3,5(10),8-tetraen-17-one hydrogenate 13β-(3-hydroxypropyl) - 3-methoxygona-1,3,5(10),8,14-pentaen-17-one over a 2% palladium on calcium carbonate catalyst in benzene according to the manipulative procedure described above.

To prepare 13β - ethyl - 3-methoxygona-1,3,5(10),8-tetraen-17-one hydrogenate 13β-ethyl - 3 - ethoxygona-1,3,5(10),8,14-pentaen-17-one over a 2% palladium on calcium carbonate catalyst in benzene according to the manipulative procedure described above.

To prepare 13β - phenethyl-3-propoxygona-1,3,5(10),8-tetraen-17-one hydrogenate 13β-phenethyl-3-propoxygona-1,3,5(10),8,14-pentaen-17-one over a 2% palladium on calcium carbonate catalyst in benzene according to the manipulative procedure described above.

To prepare 13β - isobutyl - 3 - pentyloxygona - 1,3,5(10),8 - tetraen - 17-one hydrogenate 13β - isobutyl-3-pentyloxygona - 1,3,5(10),8,14 - pentaen - 17-one over a 2% palladium on calcium carbonate catalyst in benzene according to the manipulative procedure described above.

To prepare 13β - (3 - hydroxypropyl) - 3 cyclopentyloxygona - 1,3,5(10),8 - tetraen - 17 - one hydrogenate 13β - (3 - hydroxypropyl) - 3 - cyclopentyloxygona-1,3,5(10),8,14 - pentaen - 17 - one over a 2% palladium on calcium carbonate catalyst in benzene according to the manipulative procedure described above.

To prepare 13β - phenethyl - 3 - hydroxygona - 1,3,5(10), 8 - tetraen - 17 - one hydrogenate 13β - phenethyl-3-hydroxygona - 1,3,5(10),8,14 - pentaen - 17 - one over a 2% palladium on calcium carbonate catalyst in benzene according to the manipulative procedure described above.

To prepare 13β - (2 - diethylaminoethyl) - 2,3 - dimethoxygona - 1,3,5(10),8 - tetraen - 17 - one hydrogenate 13β - (2 - diethylaminoethyl) - 2,3 - dimethoxygona-1,3,5(10),8,14 - pentaen - 17 - one over a 2% palladium on calcium carbonate catalyst in benzene according to the manipulative procedure described above.

To prepare 13β-propyl-3-ethoxy - 3 - methoxygona-1,3,5(10),8 - tetraen-17-one hydrogenate 13β-propyl-2-ethoxy-3 - methoxygona - 1,3,5(10),8,14-pentaen - 17 - one over a 2% palladium on calcium carbonate catalyst in benzene according to the manipulative procedure described above.

These compounds have estrogenic activity, lower the blood lipid level, and are useful as intermediates in the preparation of the hormonal compounds of the invention.

Example 10.—13β-cetyl-3-methoxygona-1,3,5(10),8-tetraen-17-one

Hydrogenate 13β - cetyl - 3 - methoxygona-1,3,5(10), 8,14 - pentaen - 17 - one (2.39 g.) in benzene (140 cc.) at atmospheric pressure with a previously reduced 2% palladium oxide on calcium carbonate catalyst (0.3 g.) until one molecular equivalent of hydrogen has been absorbed. Remove the catalyst and evaporate to obtain a residue which one crystallizes from ethanol to obtain the title product (2.4 g.), as colorless crystals, M.P. 54–56°; ultraviolet absorption peak at 278 mμ (ε 11,500).

$C_{34}H_{52}O_2$, calculated: C, 82.85%; H, 10.65%. Found: C, 82.75%; H, 10.75%.

This compound has estrogenic activity, and is useful as an intermediate for preparing the hormonal compounds of this invention.

Example 11.—13β-methyl-3-hydroxygona-1,3,5(10),8-tetraen-17-one

Hydrogenate 13β - methyl - 3 - acetoxygona-1,3,5(10), 8,14 - pentaen - 17 - one (0.05 g. obtained by the acetylation of 13β-methyl-3-hydroxygona-1,3,5(10),8,14-pentaen-17-one using pyridine and acetic anhydride) in benzene (15 cc.) at atmospheric pressure using a 10% palladized charcoal catalyst (0.025 g.). Hydrogenation slows down markedly after the requisite quantity of hydrogen for monohydrogenation has been absorbed. Remove the catalyst by filtration and evaporate the solvent to obtain as residue the crude title product.

Immediately take the product up in methanol (4 cc.), add 3 N sodium hydroxide solution (1 cc.) and shake the mixture for 20 minutes. Acidify and extract with ether to obtain a product which one dissolves in benzene and passes through a column of activated fuller's earth. Evaporate the resulting solution and recrystallize the residue from methanol to obtain the title product, M.P. 225–227°; ultraviolet absorption peak at 278 m$\mu$ ($\epsilon$ 15,300).

This compound has estrogenic activity, lowers the blood lipid level, and is useful as an intermediate for preparing the hormonal compounds of this invention.

Example 12.—13$\beta$-methyl-3-hydroxygona-1,3,5(10),8-tetraen-17-one

Shake 13$\beta$ - methyl - 3 - hydroxygona-1,3,5(10),8,14-pentaen-17-one (0.05 g.) in benzene (25 cc.) in hydrogen at atmospheric pressure using a 10% palladized charcoal catalyst (0.025 g.). Hydrogenation becomes very slow when 1.1 moles hydrogen has been absorbed. Filter and evaporate to obtain the title product (0.035 g.), recrystallize from methanol to get pale blue crystals, M.P. 225–228°, melting to a red liquid; ultraviolet absorption peak at 280 m$\mu$ ($\epsilon$ 12,000).

This compound has estrogenic activity, lowers the blood lipid level, and is useful as an intermediate for preparing the hormonal compounds of this invention.

Example 13.—13$\beta$-ethyl-3-hydroxygona-1,3,5(10),8-tetraen-17-one

Hydrogenate 13$\beta$ - ethyl - 3 - hydroxygona-1,3,5(10),8,14 - pentaen - 17 - one (0.5 g.) in benzene (25 cc.) at atmospheric pressure using a 10% palladized charcoal catalyst (0.025 g.). After the absorption of 1.1 molar equivalents of hydrogen, hydrogenation becomes very slow; remove the catalyst by filtration and evaporate the filtrate to obtain the title product which crystallizes from methanol in colorless plates (0.35 g.), M.P. 235–239°; ultraviolet absorption peak at 280.5 m$\mu$ ($\epsilon$ 15,500).

This compound has estrogenic activity, lowers the blood lipid level, and is useful as an intermediate for preparing the hormonal compounds of this invention.

Example 14.—13$\beta$-ethyl-3-acetoxygona-1,3,5(10),8-tetraen-17-one

Hydrogenate 13$\beta$ - ethyl - 3 - acetoxygona-1,3,5(10),8,14 - pentaen - 17 - one (1.8 g.) dissolved in benzene (25 ml.) at atmospheric pressure in the presence of 10% palladized charcoal (100 mg.). After 1.1 molar equivalents of hydrogen has been absorbed (ca. 12 hours) filter off the catalyst, evaporate the filtrate under reduced pressure and recrystallize the residue from ethanol. Filter the red product through "Florisil" (60 g.) with benzene-petroleum (3:1), remove the solvent and recrystallize the product from ethanol to obtain the title product, M.P. 132.5–134.5°; ultraviolet absorption peak at 277 m$\mu$ ($\epsilon$ 12,800).

This compound has estrogenic activity, lowers the blood lipid level, and is useful as an intermediate for preparing the hormonal compounds of this invention.

Example 15.—13$\beta$-ethyl-3-hydroxygona-1,3,5(10),8-tetraen-17-one

Heat 13$\beta$ - ethyl - 3 - acetoxygona - 1,3,5(10),8-tetraen-17-one (0.5 g.) and sodium hydroxide (1.2 g.) in water (10 cc.) and methanol (30 cc.) at 50° for 20 minutes in an atmosphere of nitrogen. Cool the mixture, acidify with dilute acetic acid and extract with a mixture of ether and benzene. Wash, dry and evaporate the organic extract to obtain the title products, M.P. 266–270°; ultraviolet absorption peak at 278.5 m$\mu$ ($\epsilon$ 13,200).

This compound has estrogenic activity, lowers the blood lipid level, and is useful as an intermediate for preparing the hormonal compounds of this invention.

Example 18.—13$\beta$-ethyl-3-benzyloxygona-1,3,5(10),8-tetraen-17-one

Treat 13$\beta$-ethyl-3-hydroxygona-1,3,5(10),8-tetraen-17-one (0.2 g.) in methanol (20 cc.) with an excess of an ethereal solution of phenyldiazomethane. After 18 hours add acetic acid (3 cc.) and evaporate. Filter the residue through a column of alumina (15 g.) and evaporate the solvent to obtain the title product; ultra-violet absorption peak at 280 m$\mu$ ($\epsilon$ 15,000).

This compound has estrogenic activity, lowers the blood lipid level, and is useful as an intermediate for preparing the hormonal compounds of this invention.

Example 19.—13$\beta$-methyl-3-methoxy-D-homogona-1,3,5(10),8-tetraen-17a$\beta$-ol Add 13$\beta$-methyl-3-methoxy-D-homogona-1,3,5(10),8-tetraen-17a-one to sodium borohydride (7 g.) in methanol (400 cc.) and reflux for 30 minutes. Acidify the mixture with 50% aqueous acetic acid and evaporate almost to dryness. Add water and extract the product with ether. Wash, dry and evaporate the ethereal solution and crystallize the residue from ethanol to obtain the title product, (19 g.), M.P. 83–86°; ultraviolet absorption peak at 278 m$\mu$ ($\epsilon$ 15,800); infrared absorption peaks at 2.96$\mu$ and 6.22$\mu$.

To prepare 7,13$\beta$-dimethyl-3-methoxygona-1,3,5(10),8-tetraen-17$\beta$-ol treat 7,13$\beta$-dimethyl-3-methoxygona-1,3,5(10),8-tetraen-17-one with sodium borohydride according to the manipulative procedure described above.

To prepare 13$\beta$-methylgona-1,3,5(10),8-tetraen-3,17$\beta$-diol treat 13$\beta$-methyl-3-hydroxygona-1,3,5(10),8-tetraen-17-one with sodium borohydride according to the manipulative procedure described above.

To prepare 13$\beta$-ethyl-2,3-dimethoxygona-1,3,5(10),8-tetraen-17$\beta$-ol treat 13$\beta$-ethyl-2,3-dimethoxygona-1,3,5(10),8-tetraen-17-one with sodium borohydride according to the manipulative procedure described above.

To prepare 13$\beta$-ethyl-3-ethoxygona-1,3,5(10),8-tetraen-17$\beta$-ol treat 13$\beta$-ethyl-3-ethoxygona-1,3,5(10),8-tetraen-17-one with sodium borohydride according to the manipulative procedure described above.

To prepare 13$\beta$-isobutyl-3-pentyloxygona-1,3,5(10),8-tetraen-17$\beta$-ol treat 13$\beta$-isobutyl-3-pentyloxygona-1,3,5(10),8-tetraen-17-one with sodium borohydride according to the manipulative procedure described above.

To prepare 13$\beta$-(3-dimethylaminopropyl)-1,3-dimethoxygona-1,3,5(10),8-tetraen-17$\beta$-ol treat 13$\beta$-(3-dimethylaminopropyl) - 1,3,-dimethoxygona-1,3,5(10),8-tetraen-17-one with sodium borohydride according to the manipulative procedure described above.

These compounds have estrogenic activity, lower the blood lipid level, and are useful as intermediates in the preparation of the hormonal compounds of the invention.

Example 20.—13$\beta$-methyl-3-methoxygona-1,3,5(10),8-tetraen-17$\beta$-ol

Add sodium borohydride (0.5 g.) to a solution of 13-methyl - 3-methoxygona-1,3,5(10),8-tetraen-17-one (2.9 g.) in ethanol (50 cc.), reflux for 10 minutes and then leave at room temperature for ½ hour. Acidify with glacial acetic acid and evaporate to dryness under reduced pressure. Treat the residue with water, ether-extract and wash and dry. Evaporate the extracts. Recrystallize the residue from methanol to obtain the title product (2.3 g.), M.P. 133–135°.

$C_{19}H_{24}O_2$ calculated: C, 80.2%; H, 8.5%. Found: C, 80.4%; H, 8.4%.

This compound has estrogenic activity, lowers the blood lipid level, and is useful as an intermediate for preparing the hormonal compounds of this invention.

Example 21.—13β-ethyl-3-methoxygona-1,3,5(10), 8-tetraen-17β-ol

Hydrogenate 13β-ethyl-3-methoxygona-1,3,5(10),8,14-pentaen-17β-ol (0.31 g.) and recrystallize the product from hexane-ethyl acetate to obtain the title product; ultraviolet absorption peak at 280 mμ (ε 15,000).

This compound has estrogenic ectivity, lowers the blood lipid level, and is useful as an intermediate for preparing the hormonal compounds of this invention.

Example 22.—13β-ethyl-3-methoxygona-1,3,5(10), 8-tetraen-17-one

Add 13β-ethyl-3-methoxygona-1,3,5(10),8-tetraen-17-one (16.8 g.) slowly to a solution of sodium borohydride (6 g.) in methanol (500 cc.) and swirl the mixture which boils spontaneously. When all the material has been added and the reaction has subsided, add acetic acid (15 cc.). Reduce the mixture in volume by evaporation of most of the solvent, add water and extract the product with ether. Evaporate the washed and dried extracts to obtain a crude crystalline product (16.8 g.), M.P. 102–105° on recrystallization from acetronitrile.

This compound has estrogenic activity, lowers the blood lipid level, and is useful as an intermediate for preparing the hormonal compounds of this invention.

Example 23.—13β-ethyl-3-methoxy-D-homogona-1,3,5(10),8-tetraen-17aβ-ol

Reduce 13β-ethyl-3-methoxy - D-homogona-1,3,5(10),8-tetraen-17a-one (20.9 g.) exactly as described for the preparation of the 13β-methyl compound to obtain the title product (20 g.), M.P. 110–112°; infrared absorption peaks at 2.9μ and 6.23μ.

This compound has estrogenic activity, lowers the blood lipid level, and is useful as an intermediate for preparing the hormonal compounds of this invention.

Example 24.—13β-propyl-3-methoxygona-1,3,5(10), 8-tetraen-17β-ol

Hydrogenate 13β - propyl-3-methoxygona-1,3,5(10),8,14-pentaen-17β-ol (0.32 g.) and recrystallize the product from hexane-ethyl acetate to obtain the title product, ultraviolet absorption peak at 280 mμ (ε 15,000).

This compound has estrogenic activity, lowers the blood lipid level, and is useful as an intermediate for preparing the hormonal compounds of this invention.

Example 25.—13β-propyl-3-methoxygona-1,3,5(10), 8-tetraen-17β-ol

Add 13β-propyl-3-methoxygona-1,3,5(10),8-tetraen-17-one (3.5 g.) to a solution of sodium borohydride (1.16 g.) in methanol (120 cc.). Heat the reaction mixture to reflux with stirring for 30 min. Concentrate the resulting solution, adjust its pH to 6 with aqueous acetic acid and filter off the resulting white precipiate which is the title product, (3.1 g.), M.P. 134–138°; ultraviolet absorption peak at 278 mμ (ε 15,350); infrared showed a band due to hydroxyl but no ketone present.

$C_{21}H_{28}O_2$, calculated: C, 80.7%; H, 9.0%. Found: C, 80.5%; H, 9.0%.

This compound has estrogenic activity, lowers the blood lipid level, and is useful as an intermediate for preparing the hormonal compounds of this invention.

Example 26.—13β-butyl-3-methoxygona-1,3,5(10),8-tetraen-17β-ol

Add sodium borohydride (12.1 g.) to 13β-butyl-3-methoxygona-1,3,5(10),8-tetraen - 17 - one (36.2 g.) in ethanol (1200 cc.) and reflux the mixture for 1 hour. On cooling, acidify the mixture with aqueous acetic acid and evaporate to dryness under reduced pressure. Add water to the residue and extract the product with ether. Work up in the usual manner to obtain a residue; recrystallize from hexane to obtain the 13-n-butyl-title product (26.9 g.), M.P. 90–100°; ultraviolet absorption peak at 279 mμ (ε 15,600); infrared absorption peak at 2.88μ, to absorption in the 5.71–5.88 region.

$C_{22}H_{30}O_2$, calculated: C, 80.9%; H, 9.3%. Found: C, 81.0%; H, 9.0%.

This compound possesses estrogenic activity, lowers the blood lipid level, and is useful as an intermediate for preparing the hormonal compounds of this invention.

Example 27.—13β-isobutyl-3-methoxygona-1,3,5(10),8-tetraen-17β-ol

To a stirred solution of sodium borohydride (6.0 g.) in methanol (500 cc. under nitrogen) add 13β-isobutyl-3-methoxygona - 1,3,5(10),8 - tetraen - 17 - one (17 g.). Gently heat the reaction mixture for one minute to initiate the reaction and then allow to stand for one hour at room temperature. After adding cautiously glacial acetic acid (20 cc.), concentrate the solution in vacuo to ⅓ of its volume followed by addition of water. Extract the product with ether. Wash the ethereal solution successively with water, sodium bicarbonate, and water, and dry. Evaporate the ether to obtain 13β-isobutyl-3-methoxygona-1,3,5(10),8-tetraen-17β-ol as a gum (17.0 g.; 99%); ultraviolet absorption peak at 278 mμ (ε 14,560).

This compound has estrogenic activity, lowers the blood lipid level, and is useful as an intermediate for preparing the hormonal compounds of this invention.

Example 28.—13β-cetyl-3-methoxygona-1,3,5(10),8-tetraen-17β-ol

Stir a solution of 13β-cetyl-3-methoxygona-1,3,5(10), 8-tetraen-17-one (0.60 g.) and sodium borohydride (0.20 g.) in ethanol (110 cc.) for 2 hours and leave overnight. Reflux with stirring for 2 hours, cool, and add an excess of 50% aqueous acetic acid. Evaporate the mixture to dryness under reduced pressure and partition the residue between ether and water. Work up in the usual manner to obtain the title product as a gum; infrared absorption peak at 278 mμ.

This compound has estrogenic activity, lowers the blood lipid level, and is useful as an intermediate for preparing the hormonal compounds of this invention.

Example 29.—13β-ethylgona-1,3,5(10),8-tetraene-3,17β-diol

Shake 13β-ethylgona-1,3,5(10),8,14 - pentaene-3,17β-diol (0.28 g.) in benzene (35 cc.) with 10% palladized charcoal (300 mg.) in an atmosphere of hydrogen until 25 cc. of hydrogen has been absorbed. Filter off the catalyst, evaporate the solvent and recrystallize the residue from methanol to obtain the title product, M.P. 234–238°; ultraviolet absorption peak at 280 mμ (ε 14,200).

This compound has estrogenic activity, lowers the blood lipid level, and is useful as an intermediate for preparing the hormonal compounds of this invention.

Example 30.—13β-propylgona-1,3,5(10),8-tetraene-3,17β-diol

Hydrogenate 13β-propylgona-1,3,5(10),8,14-pentaene-3,17β-diol (0.31 g.) exactly as described in the previous example to obtain the title product, M.P. 210–218°; ultraviolet absorption peak at 280 mμ (ε 12,000).

This compound possesses estrogenic activity, lowers the blood lipid level, and is useful as an intermediate for preparing the hormonal compounds of this invention.

Example 31.—13β-ethyl-3,17β-dimethoxygona-1,3,5(10),8-tetraene

Methylate 13β-ethyl-3-methoxygona-1,3,5(10),8-tetraene-17β-ol (1 g.) in methylene chloride (50 cc.) containing boron trifluoride etherate (0.1 cc.) with diazomethane (from N-nitrosomethylurea 3.1 g.) in methylene chloride (60 cc.). Leave the mixture for 5 minutes, filter, and wash the filtrate with aqueous sodium bicarbonate, 10% aqueous potassium hydroxide, and water, and dry. Recrystallize the product from hexane containing a few drops of ethanol to obtain the title product (.3 g.), M.P. 95–97°; ultraviolet absorption peak at 279 mμ (ε 16,500).

$C_{21}H_{28}O_2$, calculated: C, 80.7%; H, 9.0%. Found: C, 80.5%; H, 8.8%.

This compound possesses estrogenic activity, lowers the blood lipid level, and is useful as an intermediate for preparing the hormonal compounds of this invention.

Example 32.—13β-ethyl-3,17β-dimethoxygona-1,3,5(10),8-tetraene

Shake 13β-ethyl-3,17β-dimethoxygona-1,3,5(10),8,14-pentaene (1 g.) in benzene (50 cc.) with 2% palladium on calcium carbonate (0.5 g.) in an atmosphere of hydrogen until 1 molar equivalent of hydrogen (85 cc.) has been absorbed. Filter the catalyst and evaporate the solvent to obtain the title product, 94–97°; ultraviolet absorption peak at 278 mμ (ε 16,400).

This compound possesses estrogenic activity, lowers the blood lipid level, and is useful as an intermediate for preparing the hormonal compounds of this invention.

Example 33.—13β-butyl-3,17β-dimethoxygona-1,3,5(10),8-tetraene

Methylate 13β-butyl - 3 - methoxygona - 1,3,5(10),8-tetraen-17β-ol (1 g.) in methylene chloride (50 cc.) with diazomethane. Recrystallize the crude product from ethanol and then take up in benzene; chromatograph on neutral alumina. Benzene-ether (2:1) elutes a fraction which one recrystallizes from ethanol (6 cc.) to obtain the title product (.2 g.), M.P. 87°; ultraviolet absorption peak at 279 mμ (ε 16,700).

$C_{23}H_{32}O_2$, calculated: C, 81.1%; H, 9.5%. Found: C, 81.0%; H, 9.4%.

This compound has estrogenic activity, lowers the blood lipid level, and is useful as an intermediate for preparing the hormonal compounds of this invention.

Example 34.—13β-ethyl-3-methoxy-17,17-ethylenedioxygona-1,3,5(10),8-tetraene

Hydrogenate 13β-ethyl-3-methoxy - 17,17 - ethylenedioxygona-1,3,5(10),8,14-pentaene (2.0 g.) in benzene (70 cc.) at atmospheric pressure using a 5% palladium on calcium carbonate catalyst (0.70 g.). Uptake of hydrogen ceases after 150 cc. has been absorbed. Isolate the product and recrystallize from 95% ethanol to obtain the title product (1.3 g.), M.P. 135–137°; ultraviolet absorption peak at 278 mμ (ε 15,100).

$C_{22}H_{28}O_3$, calculated: C, 77.6%; H, 8.3%. Found: C, 77.5%; H, 8.6%.

This compound possesses estrogenic activity and blood lipid lowering activity, and is useful as an intermediate for preparing the hormonal compounds of this invention.

To prepare 6,13β-dimethyl-3-methoxy-17,17-ethylenedioxygona - 1,3,5(10),8 - tetraene hydrogenate 6,13β-dimethyl-3-methoxy - 17,17 - ethylenedioxygona-1,3,5(10),8,14-pentaene using a 5% palladium on calcium carbonate catalyst according to the manipulative procedure described above.

To prepare 13β-ethyl-1,3-dimethoxy-17,17-ethylenedioxygona-1,3,5(10),8-tetraene hydrogenate 13β-ethyl-1,3-dimethoxy - 17,17-ethylenedioxygona-1,3,5(10),8,14-pentaene using a 5% palladium on calcium carbonate catalyst according to the manipulative procedure described above.

To prepare 13β-phenethyl-3-propoxy-17,17-ethylenedioxygona-1,3,5(10),8-tetraene hydrogenate 13β-phenethyl-3 - propoxy-17,17-ethylenedioxygona-1,3,5(10),8,14-pentaene using a 5% palladium on calcium carbonate catalyst according to the manipulative procedure described above.

To prepare 13β-(3-hydroxypropyl)-3-cyclopentyloxy-17,17 - ethylenedioxygona-1,3,5(10),8-tetraene hydrogenate 13β-(3-hydroxypropyl)-3-cyclopentyloxy-17,17-ethylenedioxygona-1,3,5(10),8,14-pentaene using a 5% palladium on calcium carbonate catalyst according to the manipulative procedure described above.

These compounds possess estrogenic and blood lipid lowering activity and are useful as intermediates in the preparation of the hormonal compounds of this invention.

Example 35.—13β-ethyl-3-methoxy-17,17-(2,2-dimethylpropylenedioxy)-gona-1,3,5(10),8-tetraene Shake 13β-ethyl-3-methoxy-17,17-(2,2-dimethylpropylenedioxy)gona-1,3,5(10),8,14-pentaene (5 g.) in benzene (75 cc.) containing 2% palladized calcium carbonate (1.75 g.) with hydrogen at atmospheric pressure until one molecular equivalent has been absorbed. Recrystallize the product from 95% ethanol to obtain the title product; ultraviolet absorption peak at 276.5 mμ (ε13,500).

This compound has estrogenic activity, lowers the blood lipid level, and is useful as an intermedate for preparing the hormonal compounds of this invention.

Example 36.—13β-propyl-3-methoxy-17,17-ethylenedioxygona-1,3,5(10),8-tetraene

Shake 13β-propyl-3-methoxy-17,17-ethylenedioxygona-1,3,5(10),8,14-pentaene (2.5 g.) in benzene (80 cc.) with hydrogen at atmospheric presure in the presence of a 2% palladium on calcium carbonate catalyst (0.9 g.); hydrogen uptake ceases after the requisite amount (161 cc.) for monohydrogenation has been absorbed. Filter and evaporate to obtain a gum, which one crystallizes from ethanol to obtain the title product (1.8 g.), M.P. 119–120°; ultraviolet absorption peak at 278 mμ (ε 15,300).

$C_{23}H_{30}O_3$, calculated: C, 77.9%; H, 8.5%. Found: C, 77.7%; H, 8.5%.

This compound possesses estrogenic and blood lipid lowering activities and is useful as an intermediate for preparing the hormonal compounds of this invention.

Example 37.—13β-ethyl-3-methoxy-17α-ethynylgona-1,3,5(10),8-tetraen-17β-ol

To 13β - ethyl-3-methoxygona-1,3,5(10),8-tetraen-17-one (5.0 g.) in tetrahydrofuran (10 cc.) add 200 cc. of lithium aluminum acetylide suspension and reflux the mixture for 4 hours. Add ice water with stirring, follow by 3 N sulphuric acid to dissolve the resulting precipitate, and work up the product with ether in the usual way, to obtain the title product (5.0 g.); ultraviolet absorption peak at 276 mμ (ε 13,300).

This compound possesses estrogenic and blood lipid lowering activity and is useful as an intermediate for preparing the hormonal compounds of this invention.

Example 38.—13β-ethyl-3-methoxy-17α-ethylnylgona-1,3, 5(10),8-tetraen-17β-ol

Add 13β - ethyl-3-methoxygona-1,3,5(10),8-tetraen-17-one (92 g.) in aniline (300 cc.) with stirring to lithium acetylide (from commercial lithium amide, 50 g.) in aniline (500 cc.) under an acetylene atmosphere. Pass acetylene into the mixture with stirring for 3 days. Add water and extract the mixture with ether; free the extracts from aniline by washing with 10% sulphuric acid, and isolate the product to obtain the title product as a gum (88 g.); infrared absorption peaks at 2.75, 3.03μ.

This compound has estrogenic and blood lipid lowering activity and is useful as an intermediate for preparing the hormonal compounds of this invention.

Example 39.—13β-ethyl-3-methoxy-17α-ethynylgona-1,3, 5(10),8-tetraen-17β-ol

To a stirred suspension of lithium acetylide (42.4 g.) in a mixtnre of dioxan (240 cc.), ethylenediamine (10 cc.), and dimethylacetamide (250 cc.) add a solution of 13β - ethyl - 3-methoxygona-1,3,5(10),8-tetraen-17-one (66.6 g.) in dimethylacetamide (450 cc.) in an atmosphere of acetylene. Continue stirring for an additional 20 hours (under acetylene). Pour the reaction mixture into crushed ice (1.5 kg.) and extract with four 200 cc. portions of benzene. Wash the combined extracts with sulfuric acid and water and dry. Evaporate the solvent to obtain a crude oil which one dissolves in methanol (450 cc.) and treats with charcoal (6.5 g.). After concentrating the filtrate to 300 cc. add water (45 cc.) and cool to obtain the title compound (62.4 g., 86%). Recrystallization from methanol furnishes an analytical sample, M.P. 101–103°; ultraviolet absorption peak at 278 m$\mu$ ($\epsilon$ 16,100); infrared absorption peaks at 2.79, 3.04, 3.53, 4.81$\mu$.

$C_{22}H_{26}O_2$, calculated: C, 82.3%; H, 8.3%. Found: C, 82.0%; H, 8.1%.

This compound has estrogenic activity, lowers the blood lipid level, and is useful as an intermediate for preparing the hormonal compounds of this invention.

To prepare 13$\beta$-cetyl-3-methoxy-17$\alpha$-ethynylgona-1,3,5(10),8-tetraen-17$\beta$-ol treat 13$\beta$-cetyl-3-methoxygona-1,3,5(10),8-tetraen-17-one with lithium acetylide according to the manipulative procedure described above.

To prepare 6,13$\beta$-dimethyl-3-methoxy-17$\alpha$-ethynylgona-1,3,5(10),8-teraen-17$\beta$-ol treat 6,13$\beta$-dimethyl-3-methoxygona-1,3,5(10),8-tetraen-17-one with lithium acetylide according to the manipulative procedure described above.

To prepare 7,13$\beta$-dimethyl-3-methoxy-17$\alpha$-ethynylgona-1,3,5(10),8-tetraen-17$\beta$-ol treat 7,13$\beta$-dimethyl-3-methoxygona-1,3,5(10),8-tetraen-17-one with lithium acetylide according to the manipulative procedure described above.

To prepare 13$\beta$-methyl-2,3-dimethoxy-17$\alpha$-ethynylgona-1,3,5(10),8-tetraen-17$\beta$-ol treat 13$\beta$-methyl-2,3-dimethoxygona-1,3,5(10),8-tetraen-17-one with lithium acetylide according to the manipulative procedure described above.

To prepare 13$\beta$-ethyl-3-ethoxy-17$\alpha$-ethynylgona-1,3,5(10),8-tetraen-17$\beta$-ol treat 13$\beta$-ethyl-3-ethoxygona-1,3,5(10),8-tetraen-17-one with lithium acetylide according to the manipulative procedure described above.

To prepare 13$\beta$-phenethyl-3-propoxy-17$\alpha$-ethynylgona-1,3,5(10),8-tetraen-17$\beta$-ol treat 13$\beta$-phenethyl-3-propoxygona-1,3,5(10),8-tetraen-17-one with lithium acetylide according to the manipulative procedure described above.

To prepare 13$\beta$-(3-hydroxypropyl)-3-cyclopentyloxy-17$\alpha$-ethynylgona-1,3,5(10),8-tetraen-17$\beta$-ol treat 13$\beta$-(3-hydroxypropyl) - 3 - cyclopentyloxygona - 1,3,5(10),8-tetraen-17-one with lithium acetylide according to the manipulative procedure described above.

To prepare 13$\beta$-(2-diethylaminoethyl)-2,3-dimethoxy-17$\alpha$-ethynylgona-1,3,5(10),8-tetraen-17$\beta$-ol treat 13$\beta$-(2-diethylaminoethyl) - 2,3 - dimethoxygona - 1,3,5(10),8-tetraen-17-one with lithium acetylide according to the manipulative procedure described above.

These compounds have estrogenic activity, and are useful in the preparation of the hormonal compounds of this invention.

Example 40.—13$\beta$-ethyl-3-methoxy-17$\alpha$-ethynylgona-1,3,5(10),8-tetraen-17$\beta$-ol To a stirred suspension of lithium carbide (2.5 g.) in a mixture of dioxan (40 cc.), ethylenediamine (10 cc.), and dimethylacetamide (50 cc.) add a solution of 13$\beta$-ethyl-3-methoxygona-1,3,5(10),8-tetraen-17-one (5 g.) in dimethylacetamide (50 cc.) in an atmosphere of acetylene. Continue stirring for an additional 20 hours under acetylene. Pour the reaction mixture into crushed ice (200 g.) and extract with ether. Wash the ethereal solution with sulfuric acid and water, and dry. Evaporate the ether to obtain a crude oil which one dissolves in methanol (50 cc.); treat with charcoal (6 g.) and filter. Concentrate the filtrate to about ½ of its volume, add water (6 cc.), cool to obtain the title product (4.2 g., 77%). Recrystallize from methanol, M.P. 101–3°; ultraviolet absorption peak at 278 m$\mu$ ($\epsilon$16,100); infrared absorption peaks at 2.79, 3.04, 3.53, 4.81$\mu$.

This compound possesses estrogenic and blood lipid lowering activity and is useful as an intermediate for preparing the hormonal compounds of this invention.

Example 41.—13$\beta$-propyl-3-methoxy-17$\alpha$-ethynylgona-1,3,5(10),8-tetraen-17$\beta$-ol Add 13$\beta$-propyl-3-methoxygona-1,3,5(10),8-tetraen-17-one (2.0 g.) in aniline (30 cc.) with stirring to lithium acetylide (from lithium, 1 g.) in aniline (60 cc.) under an acetylene atmosphere. Pass a vigorous stream of acetylene into the mixture with stirring for 26 hours. Work up to obtain the title product as a red gum (2.0 g.); infrared absorption peaks at 2.80, 3.05$\mu$.

This compound has estrogenic activity, lowers the blood lipid level, and is useful as an intermediate for preparing the hormonal compounds of this invention.

Example 42.—13$\beta$-butyl-3-methoxy-17$\alpha$-ethynylgona-1,3,5(10),8-tetraen-17$\beta$-ol Add 13$\beta$-butyl-3-methoxygona-1,3,5(10),8-tetraen-17-one (3.5 g.) in aniline (35 cc.) with stirring to lithium acetylide (from commercial lithium amide, 4 g.) in aniline (55 cc.) under an acetylene atmosphere. Pass acetylene into the mixture with stirring for 40 hours. Work up to obtain the title product as a red gum (3.7 g.); infrared absorption peaks at 2.93, 3.08, 4.59$\mu$.

This compound has estrogenic activity, lowers the blood lipid level, and is useful as an intermediate for preparing the hormonal compounds of this invention.

Example 43.—13$\beta$,17$\alpha$-diethyl-3-methoxygona-1,3,5(10),8-tetraen-17$\beta$-ol Shake 13$\beta$-ethyl-3-methoxy-17$\alpha$-ethynylgona-1,3,5(10),8-tetraen-17$\beta$-ol (1.9 g.) in benzene (100 cc.) with hydrogen at atmospheric pressure in the presence of a prereduced 2% palladium on calicum carbonate catalyst (0.6 g.) until no more hydrogen is absorbed. Hydrogenation ceases when the requisite amount of hydrogen for selective saturation of the ethynyl group has been absorbed. Filter and evaporate the solvent to obtain a crystalline residue which one recrystallizes from methanol, to obtain the title product (1.5 g.), M.P. 139–140°; ultraviolet absorption peak at 276 m$\mu$ ($\epsilon$ 15,500); infrared absorption peak at 2.79$\mu$.

This compound has estrogenic activity, and is useful in the preparation of the hormonal compounds of this invention.

To obtain 13$\beta$ - cetyl - 3 - methoxy - 17$\alpha$ - ethylgona-1,3,5(10),8 - tetraen - 17$\beta$ - of hydrogenate 13$\beta$ - cetyl-3 - methoxy - 17$\alpha$ - ethynylgona - 1,3,5(10),8 - tetraen-17$\beta$-ol using a prereduced 2% palladium on calcium carbonate catalyst according to the manipulative procedure described above.

To obtain 6,13$\beta$ - dimethyl - 3 - methoxy - 17$\alpha$ - ethylgona - 1,3,5(10),8 - tetraen - 17$\beta$ - ol hydrogenate 6,13$\beta$-dimethyl - 3 - methoxy - 17$\alpha$ - ethynylgona - 1,3,5(10),8-tetraen-17$\beta$-ol using a prereduced 2% palladium on calcium carbonate catalyst according to the manipulative procedure described above.

To obtain 7,13$\beta$ - dimethyl - 3 - methoxy - 17$\alpha$ - ethylgona - 1,3,5(10),8 - tetraen - 17$\beta$ - ol hydrogenate 7,13$\beta$-dimethyl - 3 - methoxy - 17$\alpha$ - ethynylgona - 1,3,5(10),8-tetraen-17$\beta$-ol using a prereduced 2% palladium on calcium carbonate catalyst according to the manipulative procedure described above.

To obtain 13$\beta$,17$\alpha$ - diethyl - 2,3 - dimethoxygona-1,3,5(10),8 - tetraen - 17$\beta$ - ol hydrogenate 13$\beta$ - ethyl - 2,3-dimethoxy - 17$\alpha$ - ethynylgona - 1,3,5(10),8 - tetraen-17$\beta$-ol using a prereduced 2% palladium on calcium carbonate catalyst according to the manipulative procedure described above.

To obtain 13$\beta$ - phenethyl - 3 - propoxy - 17$\alpha$ - ethylgona - 1,3,5(10),8 - tetraen - 17$\beta$ - ol hydrogenate 13$\beta$-phenethyl - 3 - propoxy - 17$\alpha$ - ethynylgona - 1,3,5(10),8-tetraen-17$\beta$-ol using a prereduced 2% palladium on calcium carbonate catalyst according to the manipulative procedure described above.

To obtain 13$\beta$ - (3 - hydroxypropyl) - 3 - cyclopentyloxy - 17$\alpha$ - ethylgona - 1,3,5(10),8 - tetraen - 17$\beta$ - ol hydrogenate 13β - (3 - hydroxypropyl) - 3 - cyclopentyloxy - 17α - ethynylgona - 1,3,5(10),8 - tetraen - 17β - ol using a prereduced 2% palladium on calcium carbonate catalyst according to the manipulative procedure described above.

To obtain 13β - (2 - diethylaminoethyl) - 2,3 - dimethoxy - 17α - ethynylgona - 1,3,5(10),8 - tetraen - 17β - ol hydrogenate 13β - (2 - diethylaminoethyl) - 2,3 - dimethoxy - 17α - ethynylgona - 1,3,5(10),8 - tetraen - 17β - ol using a prereduced 2% palladium on calcium carbonate catalyst according to the manipulative procedure described above.

These compounds possess estrogenic activity, and are useful as intermediates in the preparation of the hormonal compounds of this invention.

Example 44.—13β-propyl-3-methoxy-17α-ethylgona-1,3,5(10),8-tetraen-17β-ol

Shake 13β - propyl - 3 - methoxy - 17α - ethynylgona-1,3,5(10),8-tetraen-17β-ol (1 g.) in benzene (100 cc.) with hydrogen at atmospheric pressure in the presence of a prereduced 2% palladium on calcium carbonate catalyst (0.35 g.). Hydrogenation is interrupted after the requisite amount of hydrogen for selective saturation of the ethynyl group has been absorbed; filter and evaporate to obtain a residue; crystallize from methanol to obtain the title product (0.5 g.), M.P. 106–108°; ultraviolet absorption peak at 278 mμ (ε 14,700); infrared absorption peak at 2.80μ.

This compound possesses estrogenic activity, and is useful as an intermediate in the preparation of the hormonal compounds of this invention.

Example 45.—13β-butyl-3-methoxy-17α-ethylgona - 1,3,5 (10),8-tetraen-17β-ol

Shake 13β-butyl-3-methoxy-17α-ethynylgona-1,3,5(10), 8-tetraen-17β-ol (3.7 g.) in benzene (150 cc.) with hydrogen at atmospheric pressure in the presence of a prereduced 2% palladium on calcium carbonate catalyst (1.2 g.) until the amount of hydrogen required for selective saturation of the ethynyl group has been absorbed. Crystallize the red gum (3.7 g.) obtained on filtration and evaporation from methanol to obtain crude product (2.9 g.), a portion is further recrystallized from aqueous acetonitrile to give the pure compound, M.P. 72–76°; ultraviolet absorption peak at 278 mμ (ε 15,600); infrared absorption peak at 2.97μ.

This compound possesses estrogenic activity, and is useful as an intermediate in the preparation of the hormonal compounds of this invention.

Example 46.—13β-ethyl-3-methoxy-17α-allylgona - 1,3,5-(10),8-tetraen-17β-ol

To a suspension of magnesium turnings (20 g.) in tetrahydrofuran (50 cc.) add several milliliters of a solution of allyl bromide (11.8 g.) in tetrahydrofuran (225 cc.) and initiate the reaction by crushing a piece of the suspended magnesium with a glass rod and add a small crystal of iodine. Slowly add the rest of the solution of allyl bromide in tetrahydrofuran over 30 minutes followed by the dropwise addition of a solution of 13β-ethyl-3-methoxygona-1,3,5(10),8-tetraen - 17 - one in tetrahydrofuran (1 liter) and allyl bromide (220 g.) over a period of 45 minutes. Reflux the reaction mixture for 3 hours, cool to 5° and add 20% aqueous ammonium chloride with vigorous stirring. Separate the organic layer, extract the aqueous layer with ether (400 cc.) and add ether (500 cc.) to the combined organic extracts which are then washed with cold water (5X 300 cc.), dried, the solvent evaporated and the residue recrystallized from n-hexane to obtain the title product (51 g., 88%), M.P. 123–125°; ultraviolet absorption peak at 280 mμ (ε 18,300); infrared absorption (KBr disc) peaks at 2.88, 3.43, 6.12, 6.23, 6.36, 6.67μ.

$C_{23}H_{30}O_2$, calculated: C, 81.6%; H, 8.92%. Found: C, 81.55%; H, 8.81%.

This compound possesses estrogenic activity, and is useful as an intermediate in the preparation of the hormonal compounds of this invention.

Example 47.—13β-ethyl-3-methoxy-17α-propylgona-1,3,5 (10),8-tetraen-17β-ol

Shake 13β-ethyl-3-methoxy-17α-allylgona - 1,3,5(10),8-tetraen-17β-ol (50 g.) with prereduced 2% palladium on calcium carbonate catalyst (25 g.) in benzene (500 cc.) in an atmosphere of hydrogen until one molecular equivalent of hydrogen has been absorbed (3.6 l.). Filter off the catalyst, evaporate the solvent and recrystallize the residue from hexane to obtain the title product. (40 g., 80%), M.P. 137–139°; ultraviolet absorption peak at 278 mμ (ε 16,800); infrared absorption (KBr disc) peaks at 2.95, 3.5, 6.25, 6.37, 6.68μ.

This compound possesses estrogenic activity, and is useful as an intermediate in the preparation of the hormonal compounds of this invention.

Example 48.—D-homo-13β-methyl-3-methoxygona - 1,3,5 (10),9(11)-tetraen-17a-one

Dissolve the crude reduced diketone obtained by catalytic hydrogenation of 5-(2-m-methoxyphenylethyl)-8-methyl-6-oxo-Δ$^{5(10)}$-Octalin-1-one in methanol (16 cc.) containing concentrated hydrochloric acid (4 cc.). Keep the solution for 3 hours at room temperature and then 1 hour at 0° C. Filter the crystalline precipitate of cyclodehydrated product and recrystallize from ethyl acetate to obtain D-homo-13β-methyl-3 - methoxygona - 1,3,5(10),9 (11)-tetraen-17a-one (0.96 g., 51%), M.P. 172–5° C.

$C_{20}H_{24}O_2$, calculated: C, 81.0%; H, 8.2%. Found: C, 80.8%; H, 8.1%.

This compound possesses estrogenic activity, lowers the blood lipid level and is useful as an intermediate in the preparation of the hormonal compounds of this invention.

Example 49.—D-homo-13β-methyl-3-methoxygona-1,3,5 (10),9(11)-tetraen-17a-one

Reflux the crude reduced diketone (1 g.) starting material of the previous example in ethanol (25 cc.) with 20% sulphuric acid (0.2 cc.) for 2 hours. Cool, and filter the precipitate solid (273 mg.) and recrystallize from ethanol-ethyl acetate mixture to obtain D-homo-13β-methyl-3-methoxygona-1,3,5(10),9(11)-tetraen-17a-one.

This compound possesses estrogenic and blood lipid lowering activity and is useful as an intermediate for preparing the hormonal compounds of this invention.

Example 50.—D-homo-13β-methyl-3-methoxygona-1,3,5 (10),9(11) - tetraen-17a-one and D-homo-13β-methyl-3-methoxygona-1,3,5(10),8-tetraen-17a-one Reflux the crude reduced diketone (0.5 g.) starting material of the previous example in ethanol (25 cc.) with 20% sulphuric acid (10 cc.) for 2 hours; add water to the cooled solution and ether extract the mixture. Evaporate the washed and dried ether extract and obtain a crystalline residue (332 mg.), melting over the range 115–149°, with ultraviolet absorption characteristics identical with that of the mixed dehydro compounds.

These compounds possess estrogenic and blood lipid lowering activity and are useful as intermediates in the preparation of the hormonal compounds of the invention.

Example 51.—D-homo-13β-methyl-3-methoxygona-1,3,5 (10),9(11)-tetraen-17a-one

Keep 5-(2-m-methoxyphenylethyl) - 9 - methyl - trans-Decalin-1,6-dione (0.5 g.) in methanol (8 cc.) containing 10 N-hydrochloric acid (2 cc.) for 3 hours at room temperature, then cool to 0° C. for an hour. Recrystallize the filtered precipitate from ethanol-ethyl acetate mixture, to obtain D-homo-13β-methyl-3-methoxygona-1,3,5(10), 9(11)-tetraen-17a-one (0.32 g., 68%), M.P. 172–175° C.

This compound possesses estrogenic activity, lowers the blood lipid level, and is useful as an intermediate for preparing the hormonal compounds of this invention.

Example 52.—13β-methyl-3-methoxygona-1,3,5(10),9(11)-tetraen-17-one

Allow the diketone 4-(2 - m - methoxyphenylethyl) - 8-methyl - trans - hexahydroindan-1,5 - dione (0.77 g.) in methanol (25 cc.) and concentrated hydrochloric acid (4 cc.) to stand overnight at 0° C. Treat the mixture with water (50 cc.) and extract with a mixture of ether and benzene. Evaporate the washed and dried extracts to leave a gum which crystallizes (0.65 g.). Recrystallize from a mixture of ethyl acetate and ethanol to obtain 13β-methyl-3-methoxygona-1,3,5(10),9(11) - tetraen - 17 - one, M.P. 144–148° C.

This compound possesses estrogenic and blood lipid lowering activity and is useful as an intermediate for preparing the hormonal compounds of this invention.

Example 53.—13β-ethyl-3-methoxygona-1,3,5(10),9(11)-tetraen-17-one

Allow the diketone 4-(2-m - methoxyphenylethyl) - 3-ethyl-trans-hexahydroindan-1,5-dione (0.8 g.) in methanol (25 cc.) and concentrated hydrochloric acid (4 cc.) to stand 15 hours at 0° C. Filter the precipitate and recrystallize from methanol to give 13β-ethyl-3-methoxygona-1,3,5(10),9(11)-tetraene-17-one; ultraviolet absorption peak at 264 mμ (ε 18,000); infrared absorption peak at 5.78μ.

This compound possesses estrogenic and blood lipid lowering activity and is useful as an intermediate for preparing the hormonal compounds of this invention.

Example 54.—13β-ethyl-3-methoxygona-1,3,5(10),9(11)-tetraen-17β-ol

Add concentrated hydrochloric acid to a solution of 4-(2-m-methoxyphenylethyl)-8 - ethyl - 5 - oxo - 5,6,7,8-tetrahydroindan-1-ol (0.5 g.) in methanol (10 cc.) until the solution becomes permanently cloudy. Scratch the solution with a seed of product, filter the precipitate and recrystallize from hexane to obtain 13β-ethyl-3-methoxygona-1,3,5(10),9(11)-tetraen-17β-ol; ultraviolet absorption peak at 264 mμ (ε 17,600).

This compound possesses estrogenic and blood lipid lowering activity and is useful as an intermediate for preparing the hormonal compounds of this invention.

Example 55.—13β-ethyl-3-methoxygona-1,3,5(10),9(11)-tetraen-17β-ol

Reflux 13β-ethyl - 3 - methoxygona - 1,3,5(10),9(11)-tetraen-17-one (20.1 g.) and sodium borohydride (0.3 g.) in ethanol (50 cc.) for 2 hours. Add excess acetic acid and evaporate the solution almost to dryness under reduced pressure. Add water and collect the product in ether. Wash, dry, and evaporate the ethereal solution and recrystallize the residue from ethanol to obtain 13β-ethyl-3-methoxygona-1,3,5(10),9(11)-tetraen-17β-ol (1.86 g.), M.P. 79–82°; ultraviolet absorption peak at 265 mμ (ε 14,800).

This compound possesses estrogenic and blood lipid lowering activity and is useful as an intermediate for preparing the hormonal compounds of this invention.

Example 56.—13β-ethyl-3-methoxygona-1,3,5(10),9(11)-tetraen-17β-ol

Reflux 13β - ethyl-3-methoxygona-1,3,5(10),8-tetraene-17β-ol (0.5 g.) in ethanol (15 cc.) and concentrated hydrochloric acid (3 cc.) for 2 hours. Dilute the cooled solution with water and collect the product in ether. Wash, dry and evaporate the ethereal solution and recrystallize the residue from methanol to obtain 13β-ethyl-3-methoxygona-1,3,5(10),9(11) - tetraen-17β-ol; ultraviolet absorption peaks at 265 mμ (ε 15,000).

This compound has estrogenic activity, lowers the blood lipid level, and is useful as an intermediate for preparing the hormonal compounds of this invention.

Example 57.—13β-ethyl-3-methoxygona-1,3,5(10),9(11)-tetraen-17-one

Treat 13β-ethyl-3-methoxy-17,17 - ethylenedioxygona-1,3,5(10),8-tetraene (0.5 g.) exactly as described in the previous example to obtain 13β-ethyl-3-methoxygona-1,3,5(10),9(11)-tetraen-17-one, M.P. 134–138°; ultraviolet absorption peak at 266 mμ (ε 15,000); infrared absorption peaks at 5.78μ.

This compound has estrogenic activity, lowers the blood lipid level, and is useful as an intermediate for preparing the hormonal compounds of this invention.

Example 58.—13β-n-butyl-3 - methoxygona - 1,3,5(10),9(11)-tetraen-17-one

Reflux 13β-n-butyl-3-methoxygona-1,3,5(10),8-tetraen-17-one (0.2 g.) in methanol (25 cc.) and concentrated hydrochloric acid (15 cc.) for 20 minutes. Remove most of the solvent under reduced pressure, add water and extract the mixture with ether. Evaporate the washed and dried extracts and crystallize the pink gum from methanol to obtain 13β-butyl - 3 - methoxygona - 1,3,5(10),9(11)-tetraen-17-one (0.075 g.), M.P. 109–114°; ultraviolet absorption peaks at 264 mμ (ε 17,800).

To prepare 13β-isopropyl - 3 - methoxygona-1,3,5(10),9(11)-tetraen-17-one treat 13β-isopropyl-3-methoxygona-1,3,5(10),8-tetraen-17-one with methanolic hydrochloric acid according to the manipulative procedure described above.

To prepare 13β-isobutyl - 3 - methoxygona-1,3,5(10),9(11)-tetraen-17-one treat 13β-isobutyl-3-methoxygona-1,3,5(10),8-tetraen-17-one with methanolic hydrochloric acid according to the manipulative procedure described above.

To prepare 13β-cetyl-3-methoxygona-1,3,5(10),9(11)-tetraen-17-one treat 13β-cetyl-3-methoxygona-1,3,5(10),8-tetraen-17-one with methanolic hydrochloric acid according to the manipulative procedure described above.

To prepare 6,13β-dimethyl-3-methoxygona - 1,3,5(10),9(11)-tetraen-17-one treat 6,13β-dimethyl - 3 - methoxygona-1,3,5(10),8-tetraen-17-one with methanolic hydrochloric acid according to the manipulative procedure described above.

To prepare 7,13β-dimethyl-3-methoxygona-1,3,5(10),9(11)-tetraen-17-one treat 7,13β-dimethyl - 3 - methoxygona-1,3,5(10),8-tetraen-17-one with methanolic hydrochloric acid according to the procedure described above.

To prepare 13β-ethyl-2,3 - dimethoxygona - 1,3,5(10),9(11)-tetraen-17-one treat 13β-ethyl-2,3-dimethoxygona-1,3,5(10),8-tetraen - 17 - one with methanol and hydrochloric acid according to the manipulative procedure described above.

To prepare 13β-ethyl-1,3 - dimethoxygona - 1,3,5(10),9(11)-tetraen-17-one treat 13β-ethyl-1,3-dimethoxygona-1,3,5(10),8-tetraen-17-one with methanol and hydrochloric acid according to the manipulative procedure described above.

To prepare 13β-methyl-3-acetoxygona-1,3,5(10),9(11)-tetraen-17-one treat 13β-methyl-3-acetoxygona-1,3,5(10),8-tetraen-17-one with methanol and hydrochloric acid according to the manipulative procedure described above.

To prepare 13β-(3-hydroxypropyl) - 3 - methoxygona-1,3,5(10),9(11)-tetraen-17 - one treat 13β - (3 - hydroxypropyl)-3-methoxygona-1,3,5(10),9-tetraen-17 - one with methanol and hydrochloric acid according to the manipulative procedure described above.

To prepare 13β-ethyl-3-ethoxygona - 1,3,5(10),9(11)-tetraen-17-one treat 13β-ethyl-3-ethoxygona-1,3,5(10),8-tetraen-17-one with methanol and hydrochloric acid according to the manipulative procedure described above.

To prepare 13β-phenethyl-3-propoxygona-1,3,5(10),9(11)-tetraen-17-one treat 13β-phenethyl-3 - propoxygona-1,3,5(10),8-tetraen-17-one with methanol and hydrochloric acid according to the manipulative procedure described above.

To prepare 13β-isobutyl-3 - pentyloxygona - 1,3,5(10),9

(11)-tetraen-17-one treat 13β-isobutyl-3 - pentyloxygona-1,3,5(10),8-tetraen-17-one with methanol and hydrochloric acid according to the manipulative procedure described above.

Example 59.—13β-ethyl-3-hydroxygona-1,3,5(10),9(11) tetraen-17-one

Dissolve 4-(2-m-hydroxyphenylethyl) - 8 - ethyl - trans-hexahydroindan-1,5-dione (1 g.) in methanol (15 cc.) and add concentrated hydrochloric acid (3 cc.). Warm the mixture at 40° for 1 hour, and then cool to 0°. Filter the precipitate and wash with cold methanol. Dry the product over phosphorus pentoxide to obtain 13β-ethyl-3-hydroxygona - 1,3,5(10),9(11) - tetraen - 17 - one, M.P. 262–264°; ultraviolet absorption peak at 267 mμ (ε 15,000).

This compound has estrogenic activity, lowers the blood lipid level, and is useful as an intermediate for preparing the hormonal compounds of this invention.

Example 60.—13β-ethyl-3-hydroxygona-1,3,5(10),9(11)-tetraen-17-one

Dissolve 13β-ethyl-3-acetoxygona-1,3,5(10),8 - tetraen-17-one in warm methanol (125 ml.) and treat with concentrated hydrochloric acid (25 cc.). Heat the solution under reflux for 45 minutes, cool and keep at 0° for 1 hour; then filter the solid and wash with cold methanol. Dry the product in vacuo to obtain 13β-ethyl-3-hydroxygona-1,3,5(10),9(11)-tetraen-17-one, M.P. 265°; ultraviolet absorption peak at 266 mμ (ε 15,400).

This compound has estrogenic activity, lowers the blood lipid level, and is useful as an intermediate for preparing the hormonal compounds of this invention.

Example 61.—13β-ethylgona-1,3,5(10),9(11)-tetraen-3,17β-diol

Reflux 13β - ethyl - 3 - hydroxygona - 1,3,5(10),9(11)-tetraen-17-one (19.52 g.) in ethanol (400 cc.) with sodium borohydride (3.94 g.) for 2 hours. Evaporate the mixture almost to dryness, add water (80 cc.) and 10 N hydrochloric acid (16 cc.) and collect the product in ether. Wash, dry and evaporate the ethereal solution, evaporate to a residue and recrystallize from methanol to obtain 13β-ethylgona-1,3,5(10),9(11)-tetraen-3,17β-diol as a red solid (20.86 g.); ultraviolet absorption peaks at 265 mμ (ε 16,200); infrared absorption peaks at 2.92 and 3.07μ, no carbonyl absorption.

This compound has estrogenic activity, lowers the blood lipid level, and is useful as an intermediate for preparing the hormonal compounds of this invention.

Example 62.—13β-n-propyl-3-hydroxygona-1,3,5(10),9 (11)-tetraen-17-one

Reflux 13β-n-propyl-3-hydroxygona-1,3,5(10),8-tetraen-17-one (0.36 g.) with methanol (18 cc.) and concentrated hydrochloric acid (2 cc.) for 15 minutes. To the resulting pink solution add ether (100 cc.) and water (50 cc.), separate the ether solution, wash and dry. Evaporate to a residue and recrystallize from acetone to obtain 13β-n-propyl-3-hydroxygona-1,3,5(10),9(11)-tetraen-17-one as colorless crystals (0.17 g.), M.P. 220–225°; ultraviolet absorption peaks at 266 mμ (ε 14,000).

This compound has estrogenic activity, lowers the blood lipid level, and is useful as an intermediate for preparing the hormonal compounds of this invention.

Example 63.—13β-ethyl-3-benzoyloxygona-1,3,5(10), 9(11)-tetraen-17-one

Treat 13β-ethyl-3-hydroxygona-1,3,5(10),9(11)-tetraen-17-one (0.2 g.) in methanol (20 cc.) with an excess of an ethereal solution of phenyldiazomethane and allow the mixture to stand for 18 hours. Add acetic acid (3 cc.) and evaporate to dryness. Take the residue up in ether, wash with sodium bicarbonate solution, dry and evaporate. Filter the residue through a column of alumina (15 g.) and evaporate the solvent to obtain 13β-ethyl-3-benzyl- oxygona-1,3,5(10),9(11)-tetraen-17 - one; ultraviolet absorption peak at 265 mμ (ε 18,000).

This compound has estrogenic activity, lowers the blood lipid level, and is useful as an intermediate for preparing the hormonal compounds of this invention.

Example 64.—13β-ethyl-3-acetoxygona-1,3,5(10),9(11)-tetraen-17-one

Dissolve 13β-ethyl - 3 - hydroxygona - 1,3,5(10),9(11)-tetraen-17-one (2.0 g.) in pyridine (5.6 cc.) and acetic anhydride (3.3 cc.) and heat at 100° for 1 hour. Remove the solvents at low pressure and dissolve the residue in a little benzene and filter through a short column of Florisil, eluting with benzene-petrol (3:1). Evaporate the solvent and recrystallize the residue from ethanol to obtain 13β-ethyl-3-acetoxygona 1,3,5(10),9(11)-tetraen-17-one, M.P. 166.5–167°; ultraviolet absorption peaks at 257 mμ (ε 18,150); infrared absorption peaks at 5.73 and 5.78μ. $C_{21}H_{24}O_3$, calculated: C, 77.75; H, 7.46. Found: C, 77.49; H, 7.6%.

This compound has estrogenic activity, lowers the blood lipid level, and is useful as an intermediate for preparing the hormonal compounds of this invention.

Example 65.—13β-methyl-3-methoxygona-1,3,5(10),9(11)-tetraen-17β-ol

Treat the keto-alcohol 4-(2-m-methoxyphenylethyl)-8-methyl-5-oxo - trans - hexahydroindan - 1 - ol (0.25 g.) in methanol (2.5 cc.) with concentrated hydrochloric acid (1.5 cc.) at 0°, and afterwards allow the solution to warm up to room temperature. After 30 minutes filter the precipitate formed to obtain 13β-methyl-3-methoxygona-1,3,5 (10),9(11)-tetraen-17β-ol (0.065 g.), M.P. 114–128°; ultraviolet absorption peak at 264 mμ (ε 18,500).

This compound has estrogenic activity, lowers the blood lipid level, and is useful as an intermediate for preparing the hormonal compounds of this invention.

Example 66.—13β-methyl-3-methoxy-17,17-ethylenedioxygona-1,3,5(10),9(11)-tetraenes Reflux 13β-methyl - 3 - methoxygona - 1,3,5(10),9(11)-tetraen-17-one (0.6 g.) in benzene (60 cc.) with ethylene glycol (1 cc.) and toluene-p-sulphonic acid (0.04 g.) for 15 hours using a Dean-Stark apparatus. Work up by means of ether in the usual way to obtain the ketal 13β-methyl-3-methoxy - 17,17 - ethylenedioxygona - 1,3,5(10),9(11)-tetraene as a solid (0.45 g.); recrystallize it from light petroleum, M.P. 130–132° C.

$C_{21}H_{28}O_3$, calculated: C, 77.3%; H, 8.0%. Found: C, 77.2%, H, 8.05%.

To prepare 13β-ethyl-3-methoxy-17,17-ethylenedioxygona-1,3,5(10),9(11)-tetraen treat 13β-ethyl-3-methoxy gona-1,3,5(10),9(11)-tetraen-17-one with excess ethylene glycol in benzene in the presence of a catalytic amount of toluene-p-sulphonic acid according to the manipulative procedure described above.

To prepare 13β-n-propyl-3-methoxy-17,17-ethylenedioxygona - 1,3,5(10),9(11) - tetraene treat 13β - propyl - 3-methoxygona-1,3,5(10),9(11)-tetraen-17-one with excess ethylene glycol in benzene in the presence of a catalytic amount of toluene-p-sulphonic acid according to the manipulative procedure described above.

To prepare 13β-ethyl-2,3-dimethoxy-17,17-ethylenedioxygona-1,3,5(10), 9(11)-tetraene, treat 13β-ethyl-2,3-dimethoxygona-1,3,5(10),9(11)-tetraen-17-one with excess ethylene glycol in benzene in the presence of a catalytic amount of toluene-p-sulphonic acid according to the manipulative procedure described above.

To prepare 13β-ethyl-1,3-dimethoxy-17,17-ethylenedioxygona-1,3,5(10),9(11)-tetraene treat 13β-ethyl-1,3-dimethoxygona-1,3,5(10),9(11)-tetraen-17-one with excess ethylene glycol in benzene in the presence of a catalytic amount of toulene-p-sulphonic acid according to the manipulative procedure described above.

To prepare 13β - ethyl - 3-ethoxy-17,17-ethylenedioxygona-1,3,5(10),9(11)-tetraene treat 13β-ethyl-3-ethoxygona-1,3,5(10),9(11)-tetraen-17-one with excess ethylene glycol in benzene in the presence of a catalytic amount of toulene-p-sulphonic acid according to the manipulative procedure described above.

To prepare 13β-phenethyl-3-propoxy-17,17-ethylenedioxygona-1,3,5(10),9(11)-tetraene treat 13β-phenethyl-3-propoxygona-1,3,5,(10),9(11)-tetraen-17-one with excess ethylene glycol in benzene and toulene-p-sulphonic acid according to the manipulative procedure described above.

To prepare 13β-isobutyl-3-pentyloxy-17,17-ethylenedioxygona-1,3,5(10),9-(11)-tetraene treat 13β-isobutyl-3-pentyloxygona-1,3,5(10),9(11)-tetraen-17-one with excess ethylene glycol in benzene in the presence of a catalytic amount of toluene-p-sulphonic acid according to the manipulative procedure described above.

To prepare 3β-(3-hydroxyphenyl)-3-cyclopentyloxy-17,17-ethylenedioxygona-1,3,5(10),9(11)-tetraene, treat 13β-(3 - hydroxyphenyl) - 3 - cyclopentyloxygona-1,3,5(10),9(11)-tetraen-17-one with excess ethylene glycol in benzene in the presence of a catalytic amount of toluene-p-sulphonic acid according to the manipulative procedure described above.

To prepare 13β-(3-dimethylaminopropyl)-1,3-dimethoxy - 17,17 - ethylenedioxygona-1,3,5(10),9(11)-tetraene, treat 13β - (3-dimethylaminopropyl)-1,3-dimethoxygona-1,3,5(10),9(11)-tetraen-17-one with excess ethylene glycol in benzene in the presence of a catalytic amount of toluene-p-sulphonic acid according to the manipulative procedure described above.

These compounds have estrogenic activity, lower the blood lipid level, and are useful as intermediates in the preparation of the hormonal compounds of the invention.

Example 67.—13β-ethyl-3,17β-diacetoxygona-1,3,5(10),9(11)-tetraene

Dissolve 13β-ethylgona-1,3,5(10),9(11)-tetraene-3,17β-diol (20.86 g.) in pyridine (40 cc.) and acetic anhydride (80 cc.) and heat the mixture at 100° for 75 minutes. Remove the solvent in vacuo and dissolve the residue in a little benzene and filter through a column of Florisil (200 g.) with benzene. Evaporate the solvent to obtain the title compound (22.5 g.), M.P. 146–147°.

This compound possesses estrogenic and blood lipid lowering activity and is useful as an intermediate for preparing the hormonal compounds of this invention.

Example 68.—13β-ethyl-3-methoxy-17α-ethynylgona-1,3,5(10),9(11)-tetraene-17β-ol

Add lithium acetylide (3.5 g.) in dioxane (10 cc.) ethylenediamine (10 cc.), and dimethylacetamide (20 cc.) to 13β - ethyl - 3-methoxygona-1,3,5(10),9(11)-tetraene-17-one (3.5 g.) in dimethylacetamide (100 cc.) with stirring in an atmosphere of acetylene. Stir the mixture for 16 hours at room temperature, then pour over crushed ice and extract with ether. Evaporate the washed and dried extracts to a residue and chromatograph on florex to obtain a product which on recrystallization from methanol-water and then from ethyl acetate-hexane gives 13β-ethyl-3-methoxy - 17α-ethynylgona-1,3,5(10),9(11)-tetraene-17β-ol, M.P. 110–112°; ultraviolet absorption peaks at 263 mμ (ε 20,400); infrared absorption peaks at 2.80 and 3.05μ.

To obtain 13β-propyl-3-methoxy-17α-ethynylgona-1,3,5(10),9(11) - tetraen - 17β-ol treat 13β-propyl-3-methoxygona-1,3,5(10),9(11)-tetraen-17-one with excess lithium acetylide according to the manipulative procedure described above.

To obtain 13β-n-butyl-3-methoxy-17α-ethynylgona-1,3,5(10),9(11)-tetraen-17β-ol treat 13β - n - butyl-3-methoxygona-1,3,5(10),9(11)-tetraen - 17 - one with the excess lithium acetylide according to the manipulative procedure described above.

To obtain 13β-cetyl-3-methoxy-17α-ethynylgona-1,3,5(10),9(11)-tetraen-17β-ol treat 13β-cetyl-3-methoxygona-1,3,5(10),9(11)-tetraen-17-one with excess lithium acetylide according to the manipulative procedure described above.

To obtain 13β,6-dimethyl-3-methoxy-17α-ethynylgona-1,3,5(10),9(11) - tetraen - 17β-ol treat 13β,6-dimethyl-3-methoxygona-1,3,5(10),9(11)-tetraen-17-one with excess lithium acetylide according to the manipulative procedure described above.

To obtain 13β,7-dimethyl-3-methoxy-17α-ethynylgona-1,3,5(10),9(11) - tetraen - 17β-ol treat 13β,7-dimethyl-3-methoxygona-1,3,5(10),9(11)-tetraen-17-one with excess lithium acetylide according to the manipulative procedure described above.

To obtain 3β-ethyl-2,3-dimethoxy-17α-ethynylgona-1,3,5(10),9(11)-tetraen-17β-ol treat 13β-ethyl-2,3-dimethoxygona-1,3,5(10),9(11)-tetraen-17-one with excess lithium acetylide according to the manipulative procedure described above.

To obtain 13β-phenethyl-3-propoxy-17α-ethynylgona-1,3,5(10),9(11)-tetraen-17β-ol treat 13β-phenethyl-3-propoxygona-1,3,5(10),9(11)-tetraen-17-one with excess lithium acetylide according to the manipulative procedure described above.

To obtain 13β - (3-hydroxypropyl)-3-cyclopentyl-17α-ethynylgona-1,3,5(10),9(11)-tetraen-17β-ol treat 13β-(3-hydroxypropyl) - 3 - cyclopentylgona - 1,3,5(10),9(11)-tetraen-17-one with excess lithium acetylide according to the manipulative procedure describe above.

To obtain 13β-(2-diethylaminoethyl) - 2,3 - dimethoxy-17α-ethynylgona-1,3,5(10),9(11)-tetraen-17β-ol treat 13β-(2-diethylaminoethyl) - 2,3 - dimethoxygona-1,3,5(10),9(11)-tetraen-17-one with excess lithium acetylide according to the manipulative procedure described above.

These compounds have estrogenic activity, lower the blood lipid level, and are useful as intermediates in the preparation of the hormonal compounds of this invention.

Example 69.—13β-ethyl-3,17β-dimethoxygona-1,3,5(10),9(11)-tetraene

Treat 13β - ethyl - 3-methoxygona-1,3,5(10),9(11)-tetraen-17β-ol (0.5 g.) in methylene chloride (25 cc.) containing 1 drop of boron trifluoride etherate with a solution of diazomethane (from 1 g. of N-nitrosomethylurea) in methylene chloride (20 cc.). Stir the mixture for five minutes, filter and wash and dry the filtrate. Remove the solvent and recrystallize the residue from methanol to obtain 13β - ethyl-3,17β-dimethoxygona-1,3,5(10),9(11)-tetraene; no infrared absorption due to hydroxyl; ultraviolet absorption peak at 266 mμ (ε 15,200).

This compound has estrogenic activity, lowers the blood lipid level, and is useful as an intermediate for preparing the hormonal compounds of this invention.

Example 70.—13β,17α-diethyl-3-methoxygona-1,3,5(10),9(11)-tetraen-17β-ol

Add 13β - ethyl - 3 - methoxy - 17α - ethynylgona-1,3,5(10),9(11)-tetraen-17β-ol (1 g.) in benzene (15 cc.) to 2% prereduced palladium on calcium carbonate catalyst (300 mg.) in benzene (10 cc.) and shake the mixture in an atmosphere of hydrogen until 2 molecular equivalents of hydrogen (170 cc.) has been adsorbed. Filter the catalyst and evaporate the solvent to obtain 13β,17α-diethyl-3-methoxygona-1,3,5(10),9(11)-tetraen-17β-ol and recrystallize from methanol, M.P. 112–117°; ultraviolet absorption peak at 265 mμ (ε 16,100).

This compound has estrogenic activity, lowers the blood lipid level, and is useful as an intermediate for preparing the hormonal compounds of this invention.

To obtain 13β - propyl - 3 - methoxy - 17α - ethylgona-1,3,5(10),9(11) - tetraen - 17β - ol hydrogenate 13β - propyl - 3 - methoxy - 17α - ethynylgona - 1,3,5 (10),9(11)-tetraen-17β-ol according to the manipulative procedure described above.

To obtain 13β - butyl - 3 - methoxy - 17α - ethylgona-1,3,5(10),9(11) - tetraen - 17β - ol hydrogenate 13β - butyl - 3 - methoxy - 17α - ethynylgona - 1,3,5(10),9(11)- tetraen-17β-ol according to the manipulative procedure described above.

To obtain 13β - cetyl - 3 - methoxy - 17α - ethylgona-1,3,5(10),9(11) - tetraen - 17β - ol hydrogenate 13β-cetyl - 3 - methoxy - 17α - ethylgona - 1,3,5(10),9(11)-tetraen-17β-ol according to the manipulative procedure described above.

To obtain 6,13β - dimethyl - 3 - methoxy - 17α - ethylgona - 1,3,5(10),9(11) - tetraen - 17β - ol hydrogenate 6,13β - dimethyl - 3 - methoxy - 17α - ethynylgona - 1,3,5(10),9(11)-tetraen-17β-ol according to the manipulative procedure described above.

To obtain 7,13β - dimethyl - 3 - methoxy - 17α - ethylgona - 1,3,5(10),9(11) - tetraen - 17β - ol hydrogenate 7,13β - dimethyl - 3 - methoxy - 17α - ethynylgona-1,3,5(10),9(11)-tetraen-17β-ol according to the manipulative procedure described above.

To obtain 13β - ethyl - 2,3 - dimethoxy - 17α - ethylgona - 1,3,5(10),9(11) - tetraene - 17β - ol hydrogenate 13α - ethyl - 2,3 - dimethoxy - 17α - ethynylgona - 1,3,5(10),9(11)-tetraen-17β-ol according to the manipulative procedure described above.

To obtain 13β,17α - diethyl - 3 - ethoxygona - 1,3,5,(10),9(11) - tetraen - 17β - ol hydrogenate 13β - ethyl - 3 - ethoxy - 17α - ethynylgona - 1,3,5(10),9(11) - tetraen-17β-ol according to the manipulative procedure described above.

To obtain 13β - phenethyl - 3 - propoxy - 17α - ethylgona - 1,3,5(10),9(11) - tetraen - 17β - ol hydrogenate 13β - phenethyl - 3 - propoxy - 17α - ethynylgona - 1,3,5 (10),9(11)-tetraen-17β-ol according to the manipulative procedure described above.

To obtain 13β - (3 - hydroxypropyl) - 3 - cyclopentyloxy - 17α - ethylgona - 1,3,5(10),9(11) - tetraen - 17β-ol hydrogenate 13β - (3 - hydroxypropyl) - 3 - cyclopentyloxy - 17α - ethynylgona - 1,3,5(10),9(11) - tetraen-17β-ol according to the manipulative procedure described above.

To obtain 13β - (2 - diethylaminoethyl) - 2,3 - dimethoxy - 17α - ethylgona - 1,3,5(10),9(11) - tetraen - 17β-ol hydrogenate 13β - (2 - diethylaminoethyl) - 2,3 - dimethoxy - 17α - ethynylgona - 1,3,5(10),9(11) - tetraen-17β-ol according to the manipulative procedure described above.

These compounds have estrogenic activity, lower the blood lipid level, and are useful as intermediates in the preparation of the hormonal compounds of the invention.

Example 71.—13β-methyl-3-methoxy-D-homogona-1,3,5(10),8-tetraen-17α-one

Add 13β - methyl - 3 - methoxy - D - homogona - 1,3,5(10),8,14-pentaen-17α-one (11 g.) in tetrahydrofuran (200 cc.) to a suspension of prereduced 2% palladized calcium carbonate (6 g.) in tetrahydrofuran (100 cc.) and shake the mixture in an atmosphere of hydrogen until one molecular equivalent of hydrogen (896 cc.) has been absorbed (about 3 minutes). Filter the catalyst, remove the solvent and recrystallize the residue from ethyl acetate-ethanol to obtain the title compound (0.5 g.), M.P. 119–124°; ultraviolet absorption peak at 278 mμ (ε 15,620).

This compound has estrogenic activity, lowers the blood lipid level, and is useful as an intermediate in the preparation of the hormonal compounds of this invention.

Example 72.—13β-methyl-3-methoxygona-1,3,5(10),8-tetraen-17-one

Dissolve 13β - methyl - 3 - methoxygona - 1,3,5(10),8,14-pentaen-17-one (2 g.) in benzene (60 cc.) and shake with pre-reduced 2% palladized calcium carbonate (1 g.) in an atmosphere of hydrogen until one molecular equivalent of hydrogen has been absorbed. Filter the catalyst, evaporate the solvent and recrystallize the residue from methanol to obtain the title compound (1.4 g.), M.P. 118–119°; ultraviolet absorption maximum at 278 mμ (ε 15,000).

$C_{19}H_{22}O_2$, calculated: C, 80.8%; H, 7.85%. Found: C, 80.5%; H, 7.9%.

This compound has estrogenic activity, lowers the blood lipid level, and is useful as an intermediate in the preparation of the hormonal compounds of this invention.

Example 73.—13β-ethyl-3-methoxygona-1,3,5(10),8-tetraen-17-one

Shake 13β - ethyl - 3 - methoxygona - 1,3,5(10),8,14-pentaen-17-one (670 g.) in benzene (2.15 l.) with pre-reduced 2% palladized charcoal (225 g.) in an atmosphere of hydrogen at 25° until 57.64 l. of hydrogen have been absorbed (112 min.). Filter the catalyst, evaporate the solvent and recrystallize from methanol to obtain the title compound (561.1 g.), M.P. 110–119°; ultraviolet absorption maximum at 278 mμ (ε 14,600). Recrystallize further from methanol to obtain material, M.P. 120–122.5°.

$C_{20}H_{24}O_2$, calculated: C, 81.0%; H, 8.1%. Found: C, 81.2%; H, 8.0%.

This compound has estrogenic activity, lowers the blood lipid level, and is useful as an intermediate in the preparation of the hormonal compounds of this invention.

Example 74.—13β,17aα-diethyl-3-methoxy-D-homogona-1,3,5(10),8-tetraen-17aβ-ol

Add 13β - ethyl - 17aα - ethynyl - 3 - methoxy - D-homogona-1,3,5(10),8-tetraen-17aβ-ol (16.2 g.) in benzene (150 cc.) to pre-reduced 2% palladized charcoal (5 g.) in benzene (150 cc.) and shake the mixture in an atmosphere of hydrogen until one molecular equivalent of hydrogen (2,308 cc.) has been absorbed (1 hour). Filter the catalyst, evaporate the solvent and boil the residue with methanol (200 cc.). Cool and filter to obtain the title compound (13.0 g.), M.P. 165–170°; ultraviolet absorption peak at 278 mμ (ε 17,024).

This compound has estrogenic activity, lowers the blood lipid level, and is useful as an intermediate in the preparation of the hormonal compounds of this invention.

Example 75.—13β-ethyl-3-methoxy-17-methyl-D-homogona-1,3,5(10),8-tetraen-17a-ol

Dissolve 13β - ethyl - 3 - methoxy - D - homogona - 1,3,5(10),8-tetraen-17a-one (13.3 g.) in dry benzene (350 cc.) and add 3 molar methyl magnesium bromide in ether (200 cc.). Reflux for 8 hours, cool, and add saturated aqueous ammonium chloride dropwise. Separate the organic layer, wash, dry and evaporate and recrystallize the residue from methanol to obtain the title product (9.2 g.), M.P. 117–123°; ultraviolet absorption peak at 276 mμ (ε 15,500).

This compound has estrogenic activity, lowers the blood lipid level, and is useful as an intermediate in the preparation of the hormonal compounds of this invention.

Example 76.—17β-ethoxy-13β-ethyl-3-methoxygona-1,3,5(10),8-tetraene

Keep 13β-ethyl - 3 - methoxygona-1,3,5(10),8,14-pentaen-17-one (1 g.) in ethanol (4 cc.), triethylorthoformate (1 cc.) and concentrated sulphuric acid (1 drop) at 45° for 30 minutes. Add triethylorthoformate (0.5 cc.) and keep the mixture at 55° for a further 30 minutes. Pour the cooled solution into saturated aqueous sodium bicarbonate and extract with ether. Wash, dry and evaporate the ethereal solution and filter the residue through Florisil with hexane-benzene (9:1). Evaporate the eluate and recrystallize the residue from ethanol to obtain 17-ethoxy - 13β - ethyl - 3 - methoxygona-1,3,5(10),8,14,16-hexaene (0.42 g.), M.P. 79–81°.

Dissolve 17 - ethoxy - 13β - ethyl-3-methoxygona-1,3,5(10),8,14,16-hexaene (0.25 g.) in benzene (15 cc.) and shake with 10% palladized charcoal (0.1 g.) in an atmosphere of hydrogen at 25° until two equivalents of hydrogen (35 cc.) have been absorbed. Filter the catalyst, evaporate the solvent and filter through a column of Florisil (10 g.) with benzene-hexane (1:9). Evaporate the eluate and recrystallize the residue from methanol and then from acetone-methanol to obtain the title compound, M.P. 76–79°.

This compound has estrogenic activity, lowers the blood lipid level, and is useful as an intermediate in the preparation of the hormonal compounds of this invention.

Example 77.—3-methoxy-13β-methylgona-1,3,5(10),8-tetraen-17β-ol, hemisuccinate

Reflux 3-methoxy-13β-methylgona-1,3,5(10),8-tetraen-17β-ol (44 g.) in pyridine (600 cc.) with succinic anhydride (44 g.) for 5 hours and then stir the solution in an atmosphere of nitrogen for 16 hours. Pour the cooled solution into excess dilute hydrochloric acid and extract the mixture with chloroform. Wash, dry and evaporate the chloroform solution and triturate the residue with ether to obtain the title compound (41.8 g.), M.P. 145–148°.

This compound has estrogenic activity, lowers the blood lipid level, and is useful as an intermediate in the preparation of the hormonal compounds of this invention.

Example 78.—13β-ethyl-3-methoxygona-1,3,5(10),8-tetraen-17β-ol, hemisuccinate

Reflux 13β - ethyl-3-methoxygona-1,3,5(10),8-tetraen-17β-ol (45 g.) in pyridine (600 cc.) with succinic anhydride (45 g.) for 16 hours. Pour the cooled solution into a mixture of ice (750 g.), water (750 cc.) and 10 N hydrochloric acid (750 cc.) and extract with chloroform. Wash, dry and evaporate the chloroform solution. Triturate the residue with ether and dry to obtain the title compound (51.2 g.), M.P. 164–165°; ultraviolet absorption peak at 280 mμ ($\epsilon$ 16,080); infrared absorption peaks at 3.45, 5.75, 5.85, 6.22μ.

This compound has estrogenic activity, lowers the blood lipid level, and is useful as an intermediate in the preparation of the hormonal compounds of this invention.

Example 79.—3,17β-diacetoxy-13β-ethylgona-1,3,5(10),8-tetraene

Shake 3,17β - diacetoxy-13β-ethylgona-1,3,5(10),8,14-pentaene (0.24 g.) in benzene (10 cc.) with 10% palladized charcoal (100 mg.) in an atmosphere of hydrogen until slightly more than the volume of hydrogen for half-hydrogenation has been absorbed. Filter the catalyst, evaporate the solvent and recrystallize the residue from ethanol to obtain the title product (0.18 g.), M.P. 141–143°; ultraviolet absorption peaks at 277 mμ ($\epsilon$ 15,900).

$C_{23}H_{28}O_4$, calculated: C, 75.0%; H, 7.7%. Found: C, 74.7%; H, 7.7%.

This compound has estrogenic activity, lowers the blood lipid level, and is useful as an intermediate in the preparation of the hormonal compounds of this invention.

Example 80.—17β-acetoxy-13β-ethyl-3-methoxygona-1,3,5(10),8-tetraene

Reflux 13β - ethyl-3-methoxygona-1,3,5(10),8,14-pentaen-17-one (0.5 g.) in isopropenyl acetate (9 cc.) with p-toluenesulfonic acid (0.1 g.) for 15 hours, and then distill off 5 cc. of the solvent over 30 minutes. Dilute the cooled solution with ether, wash, dry and evaporate the ethereal solution and recrystallize the residue from ethanol to obtain 17 - acetoxy-13β-ethyl-3-methoxygona-1,3,5(10),8,14,16-hexaene (0.27 g.), M.P. 133–135°.

Dissolve 17-acetoxy - 13β - ethyl-3-methoxygona-1,3,5(10),8,14,16-hexaene (0.25 g.) in benzene (25 cc.) and shake with pre-hydrogenated 10% palladized charcoal (0.1 g.) in an atmosphere of hydrogen until two molecular equivalents of hydrogen (35 cc.) have been absorbed. Filter the catalyst, evaporate the solvent and filter the residue through a column of Florisil (10 g.) with benzene-hexane (1:1). Evaporate the eluate and recrystallize the residue from ether-methanol to obtain the title compound, M.P. 123–126°.

This compound has estrogenic activity, lowers the blood lipid level, and is useful as an intermediate in the preparation of the hormonal compounds of this invention.

Example 81.—13β-ethylgona-1,3,5(10),8-tetraene-3,17β-diol

Dissolve 3 - acetoxy-13β-ethylgona-1,3,5(10),8-tetraen-17-one (0.9 g.) in a solution of sodium borohydride (0.5 g.) in ethanol (100 cc.), keep the mixture at 25° for 16 hours and then pour into ice-water and collect the precipitate. Recrystallize from aqueous ethanol to obtain the title compound as a hemihydrate (0.6 g.), M.P. 180–182°; ultraviolet absorption peak at 276.5 mμ ($\epsilon$ 15,000).

This compound has estrogenic activity, lowers the blood lipid level, and is useful as an intermediate in the preparation of the hormonal compounds of this invention.

Example 82.—17β-bromoacetoxy-13β-methyl-3-methoxygona-1,3,5(10),8-tetraene

Treat 13β - methyl-3-methoxygona-1,3,5(10),8-tetraen-17β-ol (0.728 g.) in pyridine (0.4 cc.) and benzene (4 cc.) with bromoacetyl bromide (0.685 g.). Allow to stand for 16 hours at 25°, then add water and extract with ether. Wash, dry and evaporate the ethereal solution, filter the residue through neutral alumina with benzene, and recrystallize from ether-hexane to obtain the title product (0.45 g.), M.P. 104–107°; ultraviolet absorption peak at 280 mμ ($\epsilon$ 15,200).

$C_{21}H_{25}O_3Br$, calculated: C, 62.22%; H, 6.21%; Br, 19.72%. Found: C, 62.43%; H, 5.84%; Br, 19.7%.

This compound has estrogenic activity, lowers the blood lipid level, and is useful as intermediate in the preparation of the hormonal compounds of this invention.

Example 83.—6,13β-dimethyl-3-methoxygona-1,3,5(10),8-tetraen-17-one

Reflux 6-(m-methoxyphenyl)hept-1-ene-3-one (10 g.) with 2-methylcylopentane-1,3-dione (7 g.) in 0.12% methanolic potassium hydroxide (50 cc.) for 16 hours. Add water to the cooled mixture and isolate the product with ether to give 2-(6-m-methoxyphenyl - 3 - oxoheptyl)-2 - methylcyclopentane - 1,3 - dione (13 g.). Reflux this Michael condensate with anhydrous p-toluenesulfonic acid (4 g.) in benzene (50 cc.) for 15 minutes with continuous removal of water. Wash, dry and evaporate the cooled reaction mixture and distil the resulting gum at 200–220° (bath temp.)/0.1 mm./Hg to obtain a pink glass. Triturate with methanol and filter the crystals formed, M.P. 80–95°. Recrystallize twice from methanol to obtain 3-methoxy-6β,17β-dimethylgona-1,3,5(10),8,14-pentaen-17-one (2.5 g.), M.P. 101–104° ultraviolet absorption peak at 314 mμ ($\epsilon$ 27,800). Take up the residue from the mother liquors of the first recrystallization in a little methanol and allow to stand, and filter off the deposited crystals to obtain 3-methoxy-6α,17β-dimethoxygona-1,3,5(10),8,14-pentaen-17-one (0.04 g.), M.P. 100–103°, which depresses on admixture with the first epimer Shake 6β,13β - dimethoxy - 3-methoxygona-1,3,5(10),8,14-penaten-17-one (0.5 g.) in benzene (12 cc.) with pre-reduced 2% palladized calcium carbonate (0.17 g.) in an atmosphere of hydrogen until one molecular equivalent of hydrogen (40 cc.) has been absorbed. Filter the catalyst, evaporate the solvent and recrystallize the reisdue from methanol to give the title product (0.3 g.) M.P. 88–91°; ultraviolet absorption peak at 281 mμ ($\epsilon$ 15,800).

$C_{20}H_{24}O_2$, calculated: C, 81.05%; H, 8.2%. Found C, 80.75%; H, 8.3%.

This compound has estrogenic activity, lowers the blood lipid level, and is useful as an intermediate in the preparation of the hormonal compounds of this invention.

Example 84.—6β,13β-dimethyl-3-methoxygona-1,3,5(10),8-tetraen-17β-ol

Suspend 6β,13β-dimethyl-3-methoxygona-1,3,5(10),8-tetraen-17-one (3.0 g.) in methanol (50 cc.) and add sodium borohydride (ca. 0.5 g.). After 30 minutes add acetic acid (5 cc.) and concentrate under reduced pressure until crystallization commences, then add water and extract with ether. Wash and dry the organic solution, and evaporate and recrystallize the residue from acetonitrile to obtain the title compound (2.45 g.), M.P. 130–132°; ultraviolet absorption peak at 280 mμ (ε 15,500).

$C_{20}H_{26}O_2$, calculated: C, 80.49%; H, 8.78%. Found: C, 80.41%; H, 8.65%.

This compound has estrogenic activity, lowers the blood lipid level, and is useful as an intermediate in the preparation of the hormonal compounds of this invention.

Example 85.—3-methoxy-6α,13-dimethylgona-1,3,5(10),8-tetraen-17-one

Shake 6α,13β-dimethyl-3-methoxygona-1,3,5(10),8,14-pentaen-17-one (0.2 g.) in benzene (10 cc.) with 2% palladized calcium carbonate (0.07 g.) in an atmosphere of hydrogen until enough hydrogen to saturate one ethylenic bond has been absorbed (16.5 cc.). Filter the catalyst and evaporate the solvent to obtain the title compound (0.2 g.) as an uncrystallizable gum.

This compound has estrogenic activity, lowers the blood lipid level, and is useful as an intermediate in the preparation of the hormonal compounds of this invention.

Example 86.—3-methoxy-6α,13β-dimethylgona-1,3,5(10),8-tetraen-17β-ol

Add sodium borohydride (0.07 g.) to 3-methoxy-6α,13β-dimethylgona-1,3,5(10),8-tetraen-17-one (0.2 g.) in methanol (20 cc.) and stir for 1 hour. Acidify with aqueous acetic acid, add water and extract with ether. Wash, dry and evaporate the etheral solution to obtain the crude title compound as a crystalline solid.

This compound has estrogenic activity, lowers the blood lipid level, and is useful as an intermediate in the preparation of the hormonal compounds of this invention.

Example 87.—13β-ethyl-3-methoxy-6-methylgona 1,3,5(10),8-tetraen-17-one

Reflux 2 - (6 - m-methoxyphenyl)-3-oxoheptyl-2-ethylcyclopentane-1,3-dione (53.3 g.) in benzene (600 cc.) with p-toluenesulfonic acid monohydrate (15 g.) for 1 hour, using a water separator. Wash, dry and evaporate the benzene solution and distil the residual gum at 0.003 mm./180–200° to obtain 3-methoxy-6-methyl-3β-ethylgona 1,3,5(10),8,14-pentaen-17-one as an orange gum (38.0 g.); ultraviolet absorption peak at 311 mμ ε 27,200).

Shake this product (29 g.) in benzene (500 cc.) in an atmosphere of hydrogen with 2% palladized charcoal (7 g.). Uptake of hydrogen will practically cease when the quantity for saturation of one ethylenic bond has been absorbed. Filter the catalyst and evaporate the solvent to obtain the title compound (29 g.) as a gum.

This compound has estrogenic activity, lowers the blood lipid level, and is useful as an intermediate in the preparation of the hormonal compounds of this invention.

Example 88.—13β-ethyl-3-methoxy-6-methylgona-1,3,5(10),8-tetraen-17β-ol

Add sodium borohydride (7 g.) to 13β-ethyl-3-methoxy-6-methylgona - 1,3,5(10),8 - tetraen-17-one (29 g.) in methanol (300 cc.) and reflux the mixture for 1 hour. Add water to the cooled reaction mixture, isolate the product with ether and evaporate to obtain the title compound (32 g.) as a gum.

This compound has estrogenic activity, lowers the blood lipid level, and is useful as an intermediate in the preparation of the hormonal compounds of this invention.

Example 89.—13β-ethyl-17β-(3,5-dinitrobenzoyloxy)-3-methoxy-6-methylgona-1,3,5(10),8-tetraene Dissolve 13β-ethyl-3-methoxy-6-methylgona-1,3,5(10),8-tetraen-17β-ol (10 g.) in pyridine (50 cc.) and add 3,5-dinitrobenzoyl chloride (8 g.). Heat the mixture at 80° for 1 hour, cool and pour into dilute hydrochloric acid. Extract the mixture with ether-benzene and wash, dry and evaporate the ethereal solution. Recrystallze the residue several times from ethyl acetate to obtain the title compound, M.P. 200–205°.

This compound has estrogenic activity, lowers the blood lipid level, and is useful as an intermediate in the preparation of the hormonal compounds of this invention.

Example 90.—2,3-dimethoxy-13β-methylgona-1,3,5(10),8-tetraene-17-one

Add 6,7-dimethoxy-1-tetralone (6.1 g.) in tetrahydrofuran (50 cc.) to a solution of vinyl magnesium chloride (from magnesium 9.6 g. and excess vinyl chloride) in tetrahydrofuran (400 cc.) at 25° and stir the mixture for 4 hours, and then pour into saturated aqueous ammonium chloride and extract with ether. Wash, dry and evaporate the ethereal solution and take up the residue of 1,2,3,4-tetrahydro-6,7-dimethoxy-1-vinyl-1-tetralol in methanol (30 cc.) and add it to 2-methycyclopentane-1,3-dione (4 g.) in 0.12% methanolic potassium hydroxide (10 cc.) and reflux the mixture for 3 hours. Pour the cooled solution onto ice, extract with ether and wash, dry and evaporate the organic solution. Crystallize the residue from methanol to obtain 2,3-dimethoxy-13β-methyl-8,14-secogona-1,3,5(10),9(11)-tetraene-14,17-dione (5.4 g.), M.P. 104–106°.

$C_{20}H_{24}O_4$, calculated: C, 73.12%; H, 7.37%. Found: C, 73,37%; H, 7.14%.

Add 10 N hydrochloric acid (100 cc.) to a refluxing solution of 2,3-dimethoxy-13β-methyl-8,14-secogona-1,3,5(10),9(11)-tetraene-14,17-dione (60 g.) in methanol (600 cc.) and tetrahydrofuran (50 cc.). Cool the solution to −5°, filter the precipitate and recrystallize from methanol-tetrahydrofuran to obtain 2,3-dimethoxy-13β-methylgona-1,3,5(10),8,14-pentaen-17-one (34 g.), M.P. 134–137°. Purify from ethanol to obtain material, M.P. 137–140°.

$C_{20}H_{22}O_3$, calculated: C, 77.39%; H, 7.11%. Found: C, 77.17%; H, 7.05%.

Add 2,3 - dimethoxy - 13β - methylgona - 1,3,5(10), 8,14-pentaen-17-one (2 g.) in benzene (50 cc.) to pre-reduced 2% palladized calcium carbonate (0.5 g.) in benzene (5 cc.) and shake the mixture in an atmosphere of hydrogen until one molecular equivalent of hydrogen (156 cc.) has been absorbed. Filter the catalyst, remove the solvent and recrystallize the residue from methanol to obtain the title compound (1.1 g.), M.P. 158–162°.

$C_{20}H_{24}O_3$ calculated: C, 76.89%; C, 7.74%. Found: C, 76.58%; H, 7.68%.

This compound has estrogenic activity, lowers the blood lipid level, and is useful as an intermediate in the preparation of the hormonal compounds of this invention.

Example 91.—2,3-dimethoxy-13β-methylgona-1,3,5(10),8-tetraen-17β-ol

Add sodium borohydride (10 g.) to 2,3-dimethoxy-13β-methylgona-1,3,5(10),8-tetraen-17-one (10 g.) in ethanol (250 cc.) and stir the mixture for 2 hours. Pour the mixture into brine and extract with ether. Wash, dry and evaporate the ethereal solution to obtain the crude title product (10 g.). Recrystallize from methanol to obtain the pure compound, M.P. 178–181°.

$C_{20}H_{26}O_3$, calculated: C, 76.4%; H, 8.34%. Found: C, 76.2%; H, 8.13%.

This compound has estrogenic activity, lowers the blood lipid level, and is useful as an intermediate in the preparation of the hormonal compounds of this invention.

Example 92.—3-methoxy-6-methyl-17,17-ethylenedioxy-13β-ethylgona-1,3,5(10),8-tetraene Reflux 2 - (6 - m - methoxyphenyl) - 3 - oxoheptyl - 2 ethylcyclopentane-1,3-dione (39.7 g.) in benzene (500 cc.) with p-toluenesulfonic acid monohydrate (11.0 g.) using a water separator. After two molar equivalents of water have been removed add ethylene glycol (50 cc.) and reflux the solution for 16 hours. Wash, dry and evaporate the benzene solution and dissolve the residue in hexane. Filter the solution several times through Florex, remove the solvent and recrystallize the residue from ethanol to obtain 3-methoxy-6-methyl-17,17-ethylenedioxy - 13β - ethylgona - 1,3,5(10),8,14 - pentaene (16.8 g.), M.P. 116–119°.

Shake 3 - methoxy - 6 - methyl - 17,17 - ethylenedioxy-13β-ethylgona-1,3,5(10),8,14-pentatene (15.3 g.) in benzene (300 cc.) with 2% palladized charcoal (5.0 g.) in an atmosphere of hydrogen until one molecular equivalent of hydrogen (1040 cc.) has been absorbed (10 min.). Filter the catalyst, evaporate the solvent and recrystallize the residue from 95% ethanol to obtain the title compound (11.0 g.), M.P. 122–124°; ultraviolet absorption peak at 280 mμ ($\epsilon$ 15,140).

This compound has estrogenic activity, lowers the blood lipid level, and is useful as an intermediate in the preparation of the hormonal compounds of this invention.

Example 93.—13β-n-propyl-3-methoxy-D-homogona-1,3,5(10),8-tetraen-17a-one

Add 6-m-methoxyphenylhex-1-en-3-one (43.2 g.) to a solution of 2-n-propylcyclohexane-1,3-dione (34 g.) in pyridine (22.1 cc.) and benzene (400 cc.) and reflux the mixture for 16 hours. Wash the cooled solution with water, aqueous sodium carbonate, water, 10% sulfuric acid, water and brine. Evaporate the solution to leave 2 - (6 - m - methoxyphenyl - 3 - oxohexyl) - 2 - n - propylcyclohexane-1,3-dione (43 g.). Dissolve this product (43 g.) in benzene (400 cc.) and add the solution slowly to stirred polyphosphoric acid (250 cc.) in an atmosphere of nitrogen and continue stirring at ca. 60° for 2 hours. Add either to the cooled solution, wash with water and brine and dry. Remove the solvent and recrystallize the residue from ethanol to obtain 13β-n-propyl-3-methoxy-D-homogona-1,3,5(10),8,14-pentaene-17a-one (27.6 g.), M.P. 86–89°; ultraviolet absorption peak at 313 mμ ($\epsilon$ 24,300).

$C_{22}H_{26}O_2$, calculated: C, 81.95%; H, 8.13%. Found: C, 82.1%; H, 8.8%.

Add 13β - n - propyl - 3 - methoxy - D - homogona-1,3,5(10),8,14-pentaen-17a-one (27.6 g.) in tetrahydrofuran (250 cc.) to pre-reduced 2% palladized charcoal (7 g.) and shake this mixture in an atmosphere of hydrogen until one molecular equivalent of hydrogen (2054 cc.) has been absorbed (15 mil.). Filter the catalyst, remove the solvent and boil the residue with 95% ethanol (250 cc.). Cool and filter to obtain the title compound 22.5 g.), M.P. 146–148°; ultraviolet absorption peak at 277 mμ ($\epsilon$ 16,130).

$C_{22}H_{18}O_2$, calculated: C, 81.42%; H, 8.69%. Found: C, 81.30%; H, 8.62%.

This compound has estrogenic activity, lowers the blood lipid level, and is useful as an intermediate in the preparation of the hormonal compounds of this invention.

Example 94.—13β-n-propyl-3-methoxy-D-homogona-1,3,5(10),8-tetraen-17aβ-ol

Reflux 13β - n - propyl - 3 - methoxy - D - homogona-1,3,5(10),8-tetraen-17a-one (20 g.) in ethanol (250 cc.) with sodium borohydride (7 g.) for 1 hour, then cool, acidify with 50% aqueous acetic acid and dilute with water (500 cc.). Filter the precipitate, wash it with water and boil with ethanol (250 cc.). Cool and filter to obtain the title compound (16 g.), M.P. 122–124°; ultraviolet absorption peak at 275mμ ($\epsilon$ 16,375).

$C_{22}H_{30}O_2$, calculated: C, 80.92%; H, 9.27%. Found: C, 80.74%; H, 9.18%.

This compound has estrogenic activity, lowers the blood lipid level, and is useful as an intermediate in the preparation of the hormonal compounds of this invention.

Example 95.—17α-ethynyl-3-methoxy-13β-methylgona-1,3,5(10),8-tetraen-17β-ol

Add solid lithium acetylide-ethylenediamine complex (9.5 g.) to 3-methoxy-13β-methylgona-1,3,5(10),8-tetraen-17-one (10 g.) in dimethylacetamide (100 cc.) and stir the mixture in an atmosphere of acetylene for 15 hours. Pour into ice-water, extract with ether-benzene (1:1) and wash, dry and evaporate the organic extract. Recrystallize the residue from methanol to obtain the title compound (2.8 g.), M.P. 133–137°; infrared absorption peaks at 3.1 and 6.25μ.

This compound has estrogenic activity, lowers the blood lipid level, and is useful as an intermediate in the preparation of the hormonal compounds of this invention.

Example 96.—17α-ethyl-3-methoxy-13β-methylgona-1,3,5(10),8-tetraen-17β-ol

Add 17α-ethynyl-3-methoxy-13β-methylgona-1,3,5(10),8-tetraen-17β-ol (7 g.) in benzene (75 cc.) to a suspension of prehydrogenated 2% palladized calcium carbonate (3 g.) in benzene (50 cc.), and shake in an atmosphere of hydrogen until two molecular equivalents of hydrogen (1030 cc.) have been absorbed. Filter the catalyst, evaporate the solvent and recrystallize the residue twice from methanol to obtain the title compound (4.5 g.), M.P. 105–120°; ultraviolet absorption peak at 278 mμ ($\epsilon$ 12,000).

This compound has estrogenic activity, lowers the blood lipid level, and is useful as an intermediate in the preparation of the hormonal compounds of this invention.

Example 97.—13β-ethyl-17,17-ethylenedioxy-3-methoxy-7-methylgona-1,3,5(10),8-tetraene Hydrogenate ethyl-3-m-methoxybenzyl-but-2-enoate (2 g.) in ethanol (8 cc.) in the presence of 10% palladized charcoal (0.5 g.) until hydrogen uptake ceases (250 cc.). Filter the catalyst, evaporate the solvent and dissolve the crude product in methanol (20 cc.) containing potassium hydroxide (2 g.) and reflux for 2 hours. Add water to the cooled solution and wash with ether, and then acidify the aqueous solution and extract with ether. Evaporate the washed and dried ether extracts to obtain 3-m-methoxybenzyl butanoic acid (1.5 g.) as a gum. Stir this material with stannic chloride (2 cc.) for 1 hour at 100° and then add ice-cold 10% hydrochloric acid (20 cc.) to the cooled reaction mixture and wash the resultant oil free from stannic chloride by decantation. Take up the oil in ether, wash the ethereal solution with 1% aqueous sodium hydroxide (20 cc.) and water, dry and evaporate the solvent. Dissolve the residue in benzene and filter through alumina (5 g.). Evaporate the filtrate and recrystallize the residue from ether-light petroleum to obtain 6-methoxy-3-methyl-1-tetralone (0.75 g.), M.P. 70–71.5°.

$C_{12}H_{14}O_2$, calculated: C, 75.8%; H, 7.4%. Found: C, 76.1%; H, 7.6%.

Add 6-methoxy-3-methyl-1-tetralone (2.5 g.) in tetrahydrofuran (15 cc.) during 30 minutes to a stirred solution of vinyl magnesium chloride (3.1 g., from magnesium 0.864 g.) in tetrahydrofuran (15 cc.); stir the solution for 1½ hours and pour onto a mixture of ammonium chloride and crushed ice. Extract the mixture with a mixture of equal volumes of ether and benzene, and wash, dry and evaporate the organic solution to obtain 6-methoxy-3-methyl-1-vinyl-1-tetralol (2.9 g.) as an oil. Reflux 6-methoxy-3-methyl-1-vinyl-1-tetralol (2.9 g.) with 2-ethylcyclopentane-1,3-dione (1.6 g.) in methanol (6 cc.) containing potassium hydroxide (10 mg.) for 6 hours. Concentrate the reaction mixture to small volume, add ether (15 cc.) and benzene (15 cc.), filter, and wash, dry and evaporate the filtrate to obtain an oil which crystallizes from methanol. Recrystallize three times from methanol to obtain 13 - ethyl - 3 - methoxy-7-methyl-8,14-secogona-1,3,5(10),9(11)-tetraene-14,17-dione (0.688 g.), M.P. 75–80°; ultraviolet absorption peak at 267 mμ (ε 18,600).

$C_{21}H_{26}O_3$, calculated: C, 77.3%; H, 8.0%. Found: C, 77.1%; H, 8.1%.

To an anhydrous solution of p-toluenesulfonic acid (from the monohydrate 0.5 g.) in benzene (50 cc.) add the foregoing seco-compound (1.0 g.) and stir the mixture at 25° for 15 hours. Wash, dry and evaporate the solution to obtain 13β-ethyl-3-methoxy-7-methylgona-1,3,5(10),8,14-pentaen-17-one (0.8 g.) as a brown gum. Distill at 160°/0.002 mm. to obtain the material as a viscous straw colored gum.

Reflux 13β-ethyl-3-methoxy-7-methylgona-1,3,5(10),8,14-pentaen-17-one (2 g.) with p-toluenesulfonic acid (0.4 g.) in ethylene glycol (30 cc.) and benzene (300 cc.) for 16 hours with continuous removal of water. Wash, dry and evaporate the cooled solution and recrystallize the residue from methanol to obtain 13β-ethyl-17,17-ethylenedioxy-3-methoxy - 7 - methylgona-1,3,5(10),8,14-pentaene (0.86 g.), M.P. 126.5–129°; ultraviolet absorption peak at 313 mμ (ε 30,400).

Add 13β - ethyl-17,17-ethylenedioxy-3-methoxy-7-methylgona-1,3,5(10),8,14-pentaene (0.7 g.) in benzene (8 cc.) to pre-reduced 2% palladized charcoal (0.225 g.) in benzene (3 cc.) and tetrahydrofuran (2 cc.) and shake in an atmosphere of hydrogen until one molecular equivalent of hydrogen (48 cc.) has been absorbed (3 hours). Filter the catalyst, evaporate the solvent and recrystallize the residue twice from methanol to obtain the title compound (0.33 g.), M.P. 147–151°; ultraviolet absorption peak at 280 mμ (ε 15,500).

This compound has estrogenic activity, lowers the blood lipid level, and is useful as an intermediate in the preparation of the hormonal compounds of this invention.

Example 98.—Ethyl-3-methoxy-13β-ethylgona-1,3,5(10),8-tetraen-17-one-16-glyoxylate Add diethyl oxalate (2.36 g.) to a suspension of sodium methoxide (1.08 g.) in benzene (10 cc.) in an atmosphere of nitrogen, and then add 13β-ethyl-3-methoxygona-1,3,5(10),8-tetraen-17-one (2.95 g.) in benzene (10 cc.). Shake the mixture for 5 minutes and then leave for 15 hours. Add water with cooling, then a little methanol and 5% aqueous potassium hydroxide to dissolve all the solid material. Separate the aqueous phase and extract the organic layer with 5% aqueous potassium hydroxide. Acidify the combined aqueous extracts with 2 N hydrochloric acid and extract with ether. Wash, dry and evaporate the ethereal solution and recrystallize the residue from methanol-ethyl acetate to obtain the title compound (2.9 g.), M.P. 125–128°; ultraviolet absorption peak at 286 mμ (ε 24,200).

This compound has estrogenic activity, lowers the blood lipid level, and is useful as an intermediate in the preparation of the hormonal compounds of this invention.

Example 99.—13β-ethyl-3-methoxy-16-methylgona-1,3,5(10),8-tetraen-17-one

Reflux ethyl-3-methoxy - 13β - ethylgona-1,3,5(10),8-tetraen-17-one-16-glyoxalate (2.4 g.) with anhydrous potassium carbonate (2 g.) and methyl iodide (3 cc.) in acetone (30 cc.) for 20 hours. Add methyl iodide (3 cc.) and reflux a further 20 hours. Evaporate the mixture almost to dryness, add water and extract with ether. Wash the ethereal solution with 1 N sodium hydroxide, brine and dry. Evaporate the solvent and treat the residue with sodium ethoxide (from the metal 0.25 g.) in ethanol (25 cc.) and allow the mixture to stand a 25° for 24 hours. Add water (15 cc.) and reflux the mixture for 75 minutes, adding 0.3 g. of zinc dust after 15 minutes and a further 0.3 g. after 40 minutes. Decant the cooled mixture and wash the zinc residue with benzene and add ether (200 cc.). Shake the mixture with a solution of sodium hydroxide (7.5 g.) in water (150 cc.), separate the aqueous layer and extract it with ether (50 cc.) and wash the combined organic solutions with 0.5 N hydrochloric acid, water, aqueous sodium bicarbonate, brine and dry. Add water, extract with ether, and wash, dry and evaporate the ethereal solution. Recrystallize the residue from ethanol to obtain the title compound (0.85 g.), M.P. 131–133°; ultraviolet absorption maximum at 280 mμ (ε 16,400).

This compound has estrogenic activity, lowers the blood lipid level, and is useful as an intermediate in the preparation of the hormonal compounds of this invention.

Example 100.—13β-ethyl-3-methoxy-16-oximinogona-1,3,5(10),8-tetraen-17-one

Add 13β-ethyl-3-methoxygona - 1,3,5(10),8-tetraen-17-one (3 g.) to a solution of potassium (0.75 g.) in tert-butanol (30 cc.) and stir the mixture for 4 hours. Add isoamyl nitrite (2.3 g.) and continue stirring for 17 hours at 25°, then at 50° for 2 hours and finally for 4 hours at 25°. Add ice and water, wash with ether, and then acidify the aqueous phase with acetic acid and extract with ether. Wash, dry and evaporate the ethereal solution and recrystallize the residue from acetonitrile to obtain the title compound (1.6 g.) which decomposes at ca. 210° and melts ca. 223°; ultraviolet absorption peak at 275 mμ (ε 16,500).

This compound has estrogenic activity, lowers the blood lipid level, and is useful as an intermediate in the preparation of the hormonal compounds of this invention.

Example 101.—13β-ethyl-3-methoxygona-1,3,5(10),8-tetraen-17β-ol-16-one

Heat 13β-ethyl-3-methoxy-16 - oximinogona-1,3,5(10),8-tetraen-17-one (0.5 g.) with zinc dust (0.5 g.), acetic acid (15 cc.) and water (1 cc.) at 100° until dissolution is complete. Add water (15 cc.) and reflux the mixture for 75 minutes, adding 0.3 g. of zinc dust after 15 minutes and a further 0.3 g. after 40 minutes. Decant the cooled mixture and wash the zinc residue with benzene and add ether (200 cc.). Shake the mixture with a solution of sodium hydroxide (7.5 g.) in water (150 cc.), separate the aqueous layer and extract it with ether (50 cc.) and wash the combined organic solutions with 0.5 N hydrochloric acid, water, aqueous sodium bicarbonate, brine and dry. Evaporate the solvent and wash the residue with ether to obtain the title compound (0.162 g.), M.P. 163–165°; ultraviolet absorption peak at 280 mμ (ε 14,400).

This compound has estrogenic activity, lowers the blood lipid level, and is useful as an intermediate in the preparation of the hormonal compounds of this invention.

Example 102.—13β-ethyl-3-methoxy-16-methylgona-1,3,5(10),8-tetraen-16β,17β-diol

Reflux 13β-ethyl-3-methoxygona - 1,3,5(10),8-tetraen-17-β-ol-16-one (0.5 g.) in benzene (20 cc.) with 3-N methyl magnesium bromide in ether (2.5 cc.) for 2 hours. Add acetone cautiously to the cooled solution and then shake with saturated aqueous ammonium chloride. Separate the organic layer and wash, dry and evaporate. Recrystallize the residue from ether-hexane to obtain the title compound (0.22 g.), M.P. 165–167° after further recrystallization from ethyl acetate-hexane; ultraviolet absorption peak at 278 mμ (ε 15,400).

This compound has estrogenic activity, lowers the blood lipid level, and is useful as an intermediate in the preparation of the hormonal compounds of this invention.

Example 103.—13β-n-butyl-17,17 - diethoxy-3-methoxygona-1,3,5(10),8-tetraene and 13β-n-butyl-17,17-diethoxy-3-methoxygona-1,3,5(10),9(11)-tetraene Dissolve 13β-n-butyl-3 - methoxygona - 1,3,5(10),8-tetraen-17-one in ethanol (4 cc.), triethylorthoformate and concentrated sulfuric acid (0.01 cc.) at 60° and then maintain at 50° for 2 hours. Add aqueous sodium bicarbonate to the cooled reaction mixture and extract with ether. Wash, dry and evaporate the ethereal solution and filter the residue through neutral alumina with light petroleum containing 15% benzene. Evaporate the eluate to obtain a mixture of the title compounds as a gum; ultraviolet absorption peak at 272 m$\mu$ ($\epsilon$ 14,900).

These compounds have estrogenic activity, lower the blood lipid level, and are useful as intermediates in the preparation of the hormonal compounds of this invention.

Example 104.—13$\beta$-ethyl-17a$\alpha$-ethynyl-3-methoxy-D-homogona-1,3,5(10),8-tetraen-17a$\beta$-ol Add 13$\beta$-ethyl-3-methoxy-D-homogona - 1,3,5(10),8-tetraen-17a-one (20 g.) to dimethylacetamide (300 cc.) containing lithium acetylide ethylenediamine complex (40 g.) and stir the mixture in an atmosphere of acetylene for 24 hours. Pour the mixture onto ammonium chloride and crushed ice, extract with ether, and wash, dry and evaporate the ethereal solution. Recrystallize the residue from methanol to obtain the solvated title compound (16.2 g.), M.P. 80–90°.

This compound has estrogenic activity, lowers the blood lipid level, and is useful as an intermediate in the preparation of the hormonal compounds of this invention.

Example 105.—3-allyloxy-13$\beta$-ethylgona-1,3,5(10),8-tetraen-17-one

To a solution of 13$\beta$-ethylgona-1,3,5(10),8-tetraen-3-ol-17-one (0.562 g.) and potassium carbonate (0.5 g.) in ethanol (50 cc.) and water (2 cc.) add freshly distilled allyl bromide (0.65 cc.) and reflux the mixture in an atmosphere of nitrogen for 2½ hours. Add water (50 cc.) and cool the mixture at 5° for 16 hours. Filter the precipitate to obtain the title compound (0.52 g.), M.P. 108–109.5°. Further purify from 95% methanol, M.P. 108–109°; ultraviolet absorption peak at 278.5 m$\mu$ ($\epsilon$ 18,600).

$C_{22}H_{26}O_2$, calculated: C, 81.95%; H, 8.13%. Found: C, 81.79%; H, 8.17%.

This compound has estrogenic activity, lowers the blood lipid level, and is useful as an intermediate in the preparation of the hormonal compounds of this invention.

Example 106.—17$\beta$-acetoxy-3-allyloxy-13$\beta$-ethylgona-1,3,5(10),8-tetraene Dissolve 3-allyloxy-13$\beta$-ethylgona - 1,3,5(10),8-tetraen-17-one (0.46 g.) in ethanol (10 cc.) containing sodium borohydride (0.2 g.) and leave the mixture at 25° for 48 hours. Pour the solution into water, acidify to pH 4 with dilute acetic acid and extract with ether. Wash, dry and evaporate the ethereal solution, and elute the residue from a column of Florisil with benzene. Evaporate the eluate and recrystallize from methanol to obtain white hydroscopic needles. Dissolve these in acetic anhydride (1 cc.) and pyridine (2 cc.) and allow to stand for 16 hours at 25°. Pour the mixture into water, extract with ether, and wash, dry and evaporate. Triturate the residue with methanol and then recrystallize to obtain the title compound (0.07 g.), M.P. 98–104°; ultraviolet absorption peak at 278 m$\mu$ ($\epsilon$ 15,100). Recrystallize further to obtain an analytical sample, M.P. 103–105°.

$C_{24}H_{30}O_3$, calculated: C, 78.65%; H, 8.25%. Found: C, 78.48; H, 8.16%.

This compound has estrogenic activity, lowers the blood lipid level, and is useful as an intermediate in the preparation of the hormonal compounds of this invention.

Example 107.—3-cyclopentyloxy-13$\beta$-ethylgona-1,3,5 (10),8-tetraen-17-one

Dissolve 6-hydroxy-1-tetralone (16.2 g.) and sodium hydroxide (4 g.) in water (20 cc.) and ethanol (100 cc.) and add cyclopentyl bromide (21 g.) Heat the mixture under reflux for 16 hours, cool, add water and extract with ether. Wash the ethereal solution with 2 N sodium hydroxide, water, and dry. Evaporate the solvent and distill to obtain 6-cyclopentyloxy-1-tetralone (9.8 g.), B.P. 163–165°/0.4 mm.

Dissolve 6-cyclopentyloxy-1-tetralone (8.6 g.) in tetrahydrofuran (30 cc.) and add the solution to 40 cc. of vinyl magnesium bromide (from magnesium 1.95 g. and vinyl bromide 6.5 cc.) in tetrahydrofuran at 25°. Let the mixture stand for 4 hours and pour into saturated ammonium chloride solution. Extract with a mixture of ether and benzene and wash, dry and evaporate the organic extracts to obtain 1,2,3,4-tetrahydro-6-cyclopentyloxy-1-vinyl-1-naphthol as an oil (9.45 g.). Dissolve this product in methanol (100 cc.) and add the solution to 2-ethyl-cyclopentane-1,3-dione (5 g.) in methanol (5 cc.) containing potassium hydroxide (0.1 g.). Reflux for 6 hours, cool, pour into water and extract with ether. Wash and dry the ethereal solution and evaporate the solvent to obtain 3-cyclopentyloxy-13-ethyl-8,14-secogona-1,3,5(10), 9(11)-tetraen-14,17-dione as an oil (11.8 g.); ultraviolet absorption peak at 267 m$\mu$ ($\epsilon$ 18,050).

Reflux 3 - cyclopentyloxy-13-ethyl-8,14-secogona1,3,5 (10),9(11)-tetraene-14,17-dione (11.8 g.) in methanol (100 cc.) and 10 N hydrochloric acid (8 cc.) for 45 minutes. Add water and isolate the product with ether. Chromatograph on a column of Florisil (400 g.), eluting with benzene and recrystallize the solid fractions from ethyl acetate-methanol to obtain 3-cyclopentyloxy-13$\beta$-ethylgona - 1,3,5(10),8,14-pentaen-17-one (5.35 g.), M.P. 93–96°; ultraviolet absorption peak at 313 m$\mu$ ($\epsilon$ 30,900).

Shake 3 - cyclopentyloxy-13$\beta$-ethylgona-1,3,5(10),8,14-pentaen-17-one (1.17 g.) in benzene (25 cc.) in the presence of 10% palladized charcoal (0.3 g.) in an atmosphere of hydrogen until 107 cc. of hydrogen have been absorbed. Filter the mixture through celite, evaporate the filtrate to dryness and recrystallize the residue from ethanol to obtain the title compound (0.779 g.), M.P. 128–130°; ultraviolet absorption peak at 280 m$\mu$ ($\epsilon$ 17,500).

$C_{24}H_{30}O_2$, calculated: C, 82.24%; H, 8.63%. Found: C, 82.09%; H, 8.46%.

This compound has estrogenic activity, lowers the blood lipid level, and is useful as an intermediate in the preparation of the hormonal compounds of this invention.

Example 108.—3-cyclopentyloxy-13$\beta$-ethyl-17,17-ethylenedioxygona-1,3,5(10),8-tetraene Reflux 3 - cyclopentyloxy-13$\beta$-ethylgona-1,3,5(10),8,14-pentaen-17-one (1.0 g.) in benzene (30 cc.) with ethylene glycol (2.4 cc.) and p-toluenesulfonic acid monohydrate (0.21 g.) for 16 hours with continuous removal of water. Wash the cooled reaction mixture with water, aqueous potassium bicarbonate, and dry. Evaporate the solvent and recrystallize the residue from ethyl acetate-methanol to obtain 3-cyclopentyloxy-13$\beta$-ethyl-17,17-ethylenedioxygona-1,3,5(10),8,14-pentaene, M.P. 116–117°.

$C_{26}H_{32}O_3$, calculated: C, 79.55%; H, 8.22%. Found: C, 79.54%; H, 8.25%.

Hydrogenate 3 - cyclopentyloxy-13$\beta$-ethyl-17,17-ethylenedioxygona-1,3,5(10),8,14-pentaene (0.19 g.) in benzene (5 cc.) in the presence of 10% palladized charcoal (0.029 g.) until one molecular equivalent of hydrogen has been absorbed. Filter the catalyst, evaporate the solvent and recrystallize the residue from ethanol to obtain the title compound (0.128 g.), M.P. 122–125°; ultraviolet absorption peak at 279 m$\mu$ ($\epsilon$ 15,800).

This compound has estrogenic activity, lowers the blood lipid level, and is useful as an intermediate in the preparation of the hormonal compounds of this invention.

Example 109.—3-cyclopentyloxy-13$\beta$-ethylgona-1,3,5 (10),8-tetraen-17$\beta$-ol Reflux 3 - cyclopentyloxy-13$\beta$-ethylgona-1,3,5(10),8-tetraen-17-one (0.163 g.) in ethanol (20 cc.) with sodium borohydride (0.1 g.) for 10 minutes and then leave at 25° for 16 hours. Evaporate to dryness, take up the residue in water and ether, and neutralize to pH 6 with dilute acetic acid. Separate the ethereal layer, wash with aqueous sodium bi-carbonate, dry, and evaporate to dryness. Recrystallize the residue from methanol to obtain the title compound (0.096 g.), M.P. 48–51°; ultraviolet absorption peak at 279 mμ (ε 15,150).

This compound has estrogenic activity, lowers the blood lipid level, and is useful as an intermediate in the preparation of the hormonal compounds of this invention.

Example 110.—17β-acetoxy-17α-ethynyl-13β-ethyl-3-methoxygona-1,3,5(10),9(11)-tetraene Reflux 17α - ethynyl - 3 - methoxy-13β-ethylgona-1,3,5(10),9(11)-tetraen-17β-ol (1.45 g.) in pyridine (1.2 cc.), acetic anhydride (25 cc.) and acetyl chloride (12 cc.) for 90 minutes. Remove the solvents under reduced pressure and partition the residue between benzene (500 cc.) and water. Separate the benzene layer, extract the aqueous layer and wash, dry and evaporate the combined organic solution. Crystallize the residue from ethanol to obtain the title compound (1.27 g.), M.P. 166–169°; ultraviolet absorption peak at 269.5 mμ (ε 16,350). Recrystallize further for analysis, M.P. 172.5–174.5.

$C_{24}H_{28}O_3$, calculated: C, 79.09%; H, 7.74%. Found: C, 78.74%; H, 7.5%.

This compound has estrogenic activity, lowers the blood lipid level, and is useful as an intermediate in the preparation of the hormonal compounds of this invention.

Example 111.—17α-acetoxy-13β-ethyl-3-methoxygona-1,3,5(10),9(11)-tetraene

Dissolve 13β - ethyl-3-methoxygona-1,3,5(10),9(11)-tetraen-17β-ol (15 g.) in pyridine (90 cc.), benzene (75 cc.) and acetic anhydride (30 cc.) and allow the mixture to stand at 25° for 16 hours. Pour the mixture into cold water (600 cc.) and extract with ether. Wash, dry and evaporate the ethereal solution and crystallize the residue from methanol to obtain the title compound (15.6 g.), M.P. 108–110°; ultraviolet absorption peak at 265 mμ (ε 17,200).

This compound has estrogenic activity, lowers the blood lipid level, and is useful as an intermediate in the preparation of the hormonal compounds of this invention.

Example 112.—3-benzyloxy-13β-ethylgona-1,3,5(10),9(11)-tetraen-17-one

Add benzyl bromide (5 cc.) to a solution of 13β-ethyl - 3 - hydroxygona - 1,3,5(10),9(11)-tetraen-17-one (2.5 g.) in ethanol (50 cc.) containing sodium ethoxide (from sodium 0.24 g.). Reflux the mixture for 16 hours and evaporate the solvent under reduced pressure. Treat the residue with water and benzene, separate the organic layer and wash with 10% aqueous sodium hydroxide, water and dry. Evaporate the solution and adsorb the crude residue on a column of alumina (80 g.) and elute with benzene. Evaporate the eluate to obtain the title compound (2.3 g.), M.P. 135.5–137°. Recrystallize from ethanol to obtain a pure sample, M.P. 144.5–147.5°; ultraviolet absorption peak at 269 mμ (ε 18,500).

$C_{26}H_{28}O_2$, calculated: C, 83.83%; H, 7.58%. Found: C, 83.8%; H, 7.50%.

This compound has estrogenic activity, lowers the blood lipid level, and is useful as an intermediate in the preparation of the hormonal compounds of this invention.

Example 113.—3,17β-diacetoxy-13β-ethylgona-1,3,5(10),9(11),16-pentaene

Heat 3-acetoxy-13β-ethylgona-1,3,5(10),9(11)-tetraene-17-one (2.04 g.) with p-toluenesulfonic acid (0.6 g.) in isopropenyl acetate (50 cc.) at 100°, removing 3 cc. portions of the solvent after two and four hours. Keep the mixture at 100° for a further 16 hours and then distill ca. 20 cc. of solvent over 6 hours. Add ether (70 cc.) to the cooled solution, and wash with aqueous potassium bicarbonate, brine and dry. Evaporate the solvent, dissolve the residue in benzene and chromatograph on Florisil (150 g.). Elute with benzene (2 l.) and then benzene ether (49:1, 200 cc.) to obtain the title compound (1.174 g.). Recrystallize a sample from ethanol to obtain the pure compound, M.P. 151.5–152.5°.

$C_{23}H_{26}O_4$, calculated: C, 75.38%; H, 7.15%. Found: C, 75.41%; H, 7.19%.

This compound has estrogenic activity, lowers the blood lipid level, and is useful as an intermediate in the preparation of the hormonal compounds of this invention.

Example 114.—3-cyclopentyloxy-13β-ethylgona-1,3,5(10),9(11)-tetraen-17-one

Reflux 3 - cyclopentyloxy - 13β-ethylgona-1,3,5(10),8-tetraen-17-one (0.48 g.) in methanol (10 cc.) and tetrahydrofuran (4 cc.) with 10 N hydrochloric acid (2 cc.) for 45 minutes. Add water to the cooled solution, filter the precipitate and recrystallize from ethanol to obtain the title compound (0.23 g.), M.P. 124–126°; ultraviolet absorption peak at 266.5 mμ (ε 17,300).

$C_{24}H_{30}O_2$, calculated: C, 82.24%; H, 8.63%. Found: C, 82.27%; H, 8.5%.

This compound has estrogenic activity, lowers the blood lipid level, and is useful as an intermediate in the preparation of the hormonal compounds of this invention.

Example 115.—3-benzyloxy-13β-ethylgona-1,3,5(10),9(11)-tetraen-17β-ol

Reflux 3 - benzyloxy - 13β-ethylgona-1,3,5(10),9(11)-tetraen-17-one (8.4 g.) with sodium borohydride (3.0 g.) in ethanol (150 cc.) for 2 hours and then evaporate the solvent under reduced pressure. Add water and ether, and wash, dry and evaporate the ethereal solution. Recrystallize the residue from methanol to obtain the title compound (5.2 g.), M.P. 127–130°; ultraviolet absorption peak at 263 mμ (ε 19,800).

$C_{26}H_{30}O_2 \cdot 1/2 CH_3OH$, calculated: C, 81.49%; H, 8.26%. Found: C, 81.71%; H, 8.24%.

This compound has estrogenic activity, lowers the blood lipid level, and is useful as an intermediate in the preparation of the hormonal compounds of this invention.

Example 116.—2,3-dimethoxy-13β-methylgona-1,3,5(10),9(11)-tetraen-17-one

Add 10 N hydrochloric acid (1 cc.) to a boiling solution of 2,3 - dimethoxy - 13β - methylgona-1,3,5(10),8-tetraen-17-one (0.2 g.) and reflux for 15 minutes, and then pour gently into saturated aqueous sodium bicarbonate (250 cc.). Extract the mixture with ether, wash, dry and evaporate the ethereal solution and recrystallize the residue from methanol to obtain the title compound (0.15 g.), M.P. 158–162°.

$C_{20}H_{24}O_3$, calculated: 76.89%; H, 7.74%. Found: 76.64%; H, 8.03%.

This compound has estrogenic activity, lowers the blood lipid level, and is useful as an intermediate in the preparation of the hormonal compounds of this invention.

Example 117.—3-hydroxy-13β-methylgona-1,3,5(10),9(11)-tetraen-17-one

Reflux 3-hydroxy-13β-methylgona-1,3,5(10),8-tetraen-17-one (0.15 g.) in methanol (5 cc.) and tetrahydrofuran (0.5 cc.) with 10 N hydrochloric acid (1 cc.) for 15 minutes. Cool the solution, filter the precipitate and recrystallize from methanol ethanol to obtain the title compound (0.085 g.), M.P. 250–252° (dec.).

This compound has estrogenic activity, lowers the blood lipid level, and is useful as an intermediate in the preparation of the hormonal compounds of this invention.

Example 118.—3-methoxy-13β-methylgona-1,3,5(10), 9(11)-tetraen-17-one

Reflux 3-methoxy-13β-methylgona-1,3,5(10),8-tetraen-17-one (1.27 g.) in methanol (100 cc.) containing 10 N hydrochloric acid (20 cc.) for 10 minutes. Add ether and benzene to the cooled solution and wash, dry and evaporate. Recrystallize the residue from methanol to obtain the title compound (1.24 g.), M.P. 138–145°; ultraviolet absorption peak at 265 mμ (ε 18,200), slightly contaminated with starting material.

This compound has estrogenic activity, lowers the blood lipid level, and is useful as an intermediate in the preparation of the hormonal compounds of this invention.

Example 119.—13β-ethyl-17,17-ethylenedioxy-3-methoxygona-1,3,5(10),9(11)-tetraene Reflux 13β - ethyl - 3 - methoxygona-1,3,5(10),9(11)-tetraen-17-one (2.19 g.) in benzene (120 cc.) with p-toluenesulfonic acid (0.8 g.) and ethylene glycol (20 cc.) for 16 hours with continuous removal of water. Wash the cooled solution with aqueous sodium bicarbonate, water and dry. Evaporate the solvent and recrystallize the residue from ethanol to obtain the title compound (1.8 g.), M.P. 128.5–130.5°; ultraviolet absorption peak at 268 mμ (ε 16,300).

This compound has estrogenic activity, lowers the blood lipid level, and is useful as an intermediate in the preparation of the hormonal compounds of this invention.

The subject matter which the applicants regard as their invention is particularly pointed out and distinctly claimed as follows:

1. A chemical compound having a gonane nucleus wherein the A-ring is aromatic, and the 9(11) - position is unsaturated, said nucleus having attached thereto in the 13-position, a polycarbon-alkyl radical containing from two to about sixteen carbon atoms.

2. A 3 - lower alkoxygona - 1,3,5(10),9(11) - tetraene having attached thereto, in the 13-position, a polycarbon-alkyl radical containing from two to about sixteen carbon atoms.

3. A 3 - lower alkoxy - 13β - ethylgona - 1,3,5(10),9(11) - tetraene having at the 17-position at least one of the groups consisting of keto and hydroxy.

4. A process for preparing a compound having a gonane nucleus wherein the A-ring is aromatic and the 9(11) - position is unsaturated, said nucleus substituted at the 13-position with a polycarbon-alkyl radical, comprising: heating a compound having a gonane nucleus wherein the A-ring is aromatic and the 8-position is unsaturated, said nucleus substituted at the 13-position with a polycarbon-alkyl radical, in the presence of an acid catalyst.

5. 13β - ethyl - 3 - methoxygona - 1,3,5(10),9(11)-tetraen - 17 - one.

6. 13β - ethyl - 3 - methoxygona - 1,3,5(10),9(11)-tetraen - 17β - ol.

7. 13β - ethyl - 3 - hydroxygona - 1,3,5(10),9(11)-tetraen - 17 - one.

8. 13β - n - propyl - 3 - hydroxygona - 1,3,5(10),9(11)-tetraen - 17 - one.

9. 13β - ethyl - 3,17β - diacetoxygona - 1,3,5(10),9-(11) - tetraene.

10. 13β - ethyl - 3 - methoxy - 17α - ethynylgona-1,3,5(10),9(11) - tetraen - 17β - ol.

11. 13β,17α - diethyl - 3 - methoxygona - 1,3,5(10), 9(11) - tetraene - 17β - ol.

12. 3 - cyclopentyloxy - 13β - ethylgona - 1,3,5(10), 9(11) - tetraene - 17 - one.

13. 3 - benzyloxy - 13β - ethylgona - 1,3,5(10),9(11)-tetraen - 17 - one.

14. 3 - benzyloxy - 13β - ethylgona - 1,3,5(10),9(11)-tetraen - 17β - ol.

15. 2,3 - dimethoxy - 13β - methylgona - 1,3,5(10), 9(11) - tetraen - 17 - one.

References Cited

UNITED STATES PATENTS

| | | | |
|---|---|---|---|
| 2,874,173 | 2/1959 | Hogg et al. | 260—397.45 |
| 2,885,413 | 5/1959 | Hogg et al. | 260—397.45 |

H. A. FRENCH, *Primary Examiner.*